United States Patent [19]

Bukowski et al.

[11] Patent Number: 4,603,394

[45] Date of Patent: Jul. 29, 1986

[54] MICROPROCESSOR-BASED EXTRACTION TURBINE CONTROL

[75] Inventors: James M. Bukowski; Gary E. Midock, both of Pittsburgh; Ronald J. Walko, Bethel Township, Allegheny County, all of Pa.

[73] Assignee: Westinghouse Electric Corp., Pittsburgh, Pa.

[21] Appl. No.: 635,387

[22] Filed: Jul. 30, 1984

[51] Int. Cl.[4] .................. H02P 9/04; G05B 15/00; G06F 15/46

[52] U.S. Cl. .................... 364/494; 415/15; 415/17; 290/40 R; 60/645; 60/660

[58] Field of Search ............... 364/494, 492, 493, 464, 364/174, 176; 60/648, 660, 662, 645; 290/40 R, 40 A, 40 C; 415/15, 17

[56] References Cited

U.S. PATENT DOCUMENTS

| | | | |
|---|---|---|---|
| 3,452,258 | 6/1969 | Thompson | 415/15 X |
| 4,029,255 | 6/1977 | Heiser et al. | 415/15 X |
| 4,029,951 | 6/1977 | Berry et al. | 290/40 R X |
| 4,053,746 | 10/1977 | Braytenbah et al. | 364/494 |
| 4,297,848 | 11/1981 | Silvestri, Jr. | 60/660 |
| 4,427,896 | 1/1984 | Waldron | 364/494 X |
| 4,494,208 | 1/1985 | Chang | 364/494 |
| 4,550,380 | 10/1985 | Bukowski et al. | 364/494 |

Primary Examiner—Edward J. Wise
Attorney, Agent, or Firm—W. E. Zitelli

[57] ABSTRACT

A microprocessor-based controller for an extraction type steam turbine-generator unit capable of selecting from a variety of predetermined control strategies and implementing corresponding valve position control loops by generating appropriate valve position control signals in accordance with operator-chosen setpoint signals and turbine operating level signals. In a particular control strategy, automatic system frequency correction is achieved in a load control mode upon separation of the turbine-generator from the utility power grid, by detecting turbine speed deviation beyond predetermined limits and correcting turbine speed to synchronous speed without the need for operator intervention.

13 Claims, 3 Drawing Figures

MICROPROCESSOR-BASED EXTRACTION TURBINE CONTROL

CROSS REFERENCE TO RELATED APPLICATIONS

The present application is related to three previously filed patent applications (Ser. Nos. 562,378, now U.S. Pat. No. 4,577,281, 562,507, now U.S. Pat. No. 4,550,380, and 562,508, now abandoned) by the same inventors, all filed Dec. 16, 1983, which are assigned to the same assignee as the present application, and which are all entitled "Microprocessor-Based Extraction Turbine Control", the disclosures of which are incorporated herein by reference.

BACKGROUND OF INVENTION

The invention relates to steam turbine control systems, more particularly to a control system for an extraction type steam turbine.

A common aspect of many industrial environments is the required simultaneous provision of adequate process steam and electric power. In any given industrial plant, these requirements vary over time and often they are in competition in the sense that any one provision resource attempting to provide and match these requirements must balance them.

Extraction turbines are widely used in industrial environments for cogeneration of process steam and electric power. This is because of their ability to accurately match these competing requirements in a balanced and stable fashion. Industrial utilization of this matching capability requires appropriate adjustment of front-end extraction turbine control valves and the extraction valve. These adjustments are made through application of well-known valve position control loop technology.

A control loop is established by a combination of signals, including one representing the desired level of turbine operation, and one representing the existing level of turbine operation. A controller functions in the control loop to compare these two signals, and noting any discrepancy, it operates to automatically bring the turbine operation to that level required to balance these signals. The particular combination of signal elements in a control loop reflects the control strategy used by the system designer. The combined operation of several control loops achieves the overall control philosophy used in the control system design.

The majority of extraction turbines in service are used in the industrial area—steel mills, refineries, paper mills, sewage treatment plants, etc., where in the past generation of electricity by the extraction turbine was a byproduct and not really a necessity. The major use of the extraction turbine in these cases was for process steam availability. With rising energy costs and optimization of total system capacity, the extraction turbine becomes a more important factor in the system and especially in the cogeneration sense where power is being sold to the utility and being put onto the utility power grid. Now control of the megawatt output becomes a more important function that it has been in the past.

In the prior art of extraction turbine control system design, a speed control loop was incorporated as part of the overall process of bringing a turbine-generator on-line. After the operator brought the turbine to synchronous speed, 3600 rpm, he would examine instrumentation indicating the normal criteria used to synchronize the turbine, such as the phase angle and the generator voltage, and after the main generator breaker was closed the generator would be tied to the local plant power distribution system. If the local plant power distribution system was already tied to the utility power grid, the turbine speed would then be locked to the line frequency of the utility power grid and could not change.

While tied into the utility power grid, system frequency correction through speed control was not needed since the turbine speed was locked into the speed determined by the utility system frequency. Even if provided, speed control on the extraction turbine could not affect the system frequency since the extraction turbine represents a small generating capacity. Thus, no speed correction capability was provided, and this meant that the turbine-generator could not operate as a power "island" disconnected from the utility power grid. Without speed correction, a sag in the utility system frequency of sufficient duration or an outright loss of the connection to the utility power grid would cause the plant to shut down since the synchronous motors and pumps that require 60 hertz power at a constant voltage could not be maintained. A set of undervoltage relays on the generator would trip the unit because if the turbine speed was such that power was generated below a certain frequency, this could damage the generator, or the low frequency could damage the synchronous motors in the plant.

Thus, if the local plant power distribution system became separated from the large utility power grid and the generator was to continue generating power for use in a local environment, system frequency correction through speed correction was critical to smooth operation. However, prior art attempts at implementation of speed correction upon a loss of the utility power grid were unsuccessful. This was because the connection between the utility power grid and the local plant power distribution system was made through one or more circuit breakers. Typically, these tie-in breakers are owned by the utility, and no provision was made by which the extraction turbine control system could directly sense whether these breakers were or were not maintaining the connection between the local plant power distribution system and the utility power grid. Therefore, the plant operator did not have sufficient time to react to a loss of the utility power grid before taking corrective action by adjusting the turbine speed to maintain the system frequency.

The importance of system frequency correction for various system operating conditions is then apparent, but it is so for two separate reasons. If the extraction turbine is to be tied through the local plant power distribution system to a large utility power grid, it is required to enable synchronization of the turbine with the system frequency. If instead the local plant power distribution system becomes separated from the utility power grid and the turbine generator is running localized, it is important the plant equipment not be damaged while the industrial process is maintained.

The operator's control procedure in all of these cases was further complicated by the need to readjust settings due to the drift introduced by prior art analog control system circuitry which depended on discrete electronic components such as operational amplifiers, capacitors, diodes and resistors, etc. These circuits were prone to drift out of calibration over time and with temperature variations.

It would therefore be desirable to provide a simplified method of extraction turbine control to fully utilize the capabilities of the extraction turbine in meeting process steam and electrical energy requirements. It would also be desirable to have an extraction turbine control system with a system frequency correction capability that provided an automatic turbine speed correction in accordance with system operating conditions indicating separation of the turbine-generator from the utility power grid. This system would allow the operator to attend to other needs such as other adjustments made to the generator megawatt output. It would also be desirable to provide an extraction turbine control system with a system frequency correction capability that is free from drift in calibration of circuit components, thereby reducing periodic maintenance requirements. Such a control system would enable the realization of front-end boiler fuel cost reductions because of the smoother boiler operation associated with better and more stable extraction turbine control.

SUMMARY OF THE INVENTION

An extraction type steam turbine-generator unit is provided with a microprocessor-based controller for selecting predetermined control strategies and implementing corresponding valve position control loops by generating appropriate valve position control signals in accordance with operator-chosen setpoint signals and turbine operating level signals. As isochronous control operation is disclosed involving automatic system frequency correction upon separation of the turbine-generator from the utility power grid by sensing a predetermined speed deviation from synchronous speed at which time a speed corrector operates to position the extraction turbine inlet steam control valves so as to correct to synchronous speed without the need for operator intervention.

DESCRIPTION OF THE PREFERRED EMBODIMENT

The present invention provides a microprocessor-based extraction turbine-generator control system having an isochronous control operation through automatic speed correction. The isochronous control operation maintains system frequency by monitoring turbine speed for excessive speed deviations from synchronous speed. In accordance with the magnitude of the excessive speed deviations, a correction signal is determined which is then applied to a valve controller to position the extraction turbine inlet steam control valves so as to correct turbine speed without the need for operator intervention.

Figure 1:
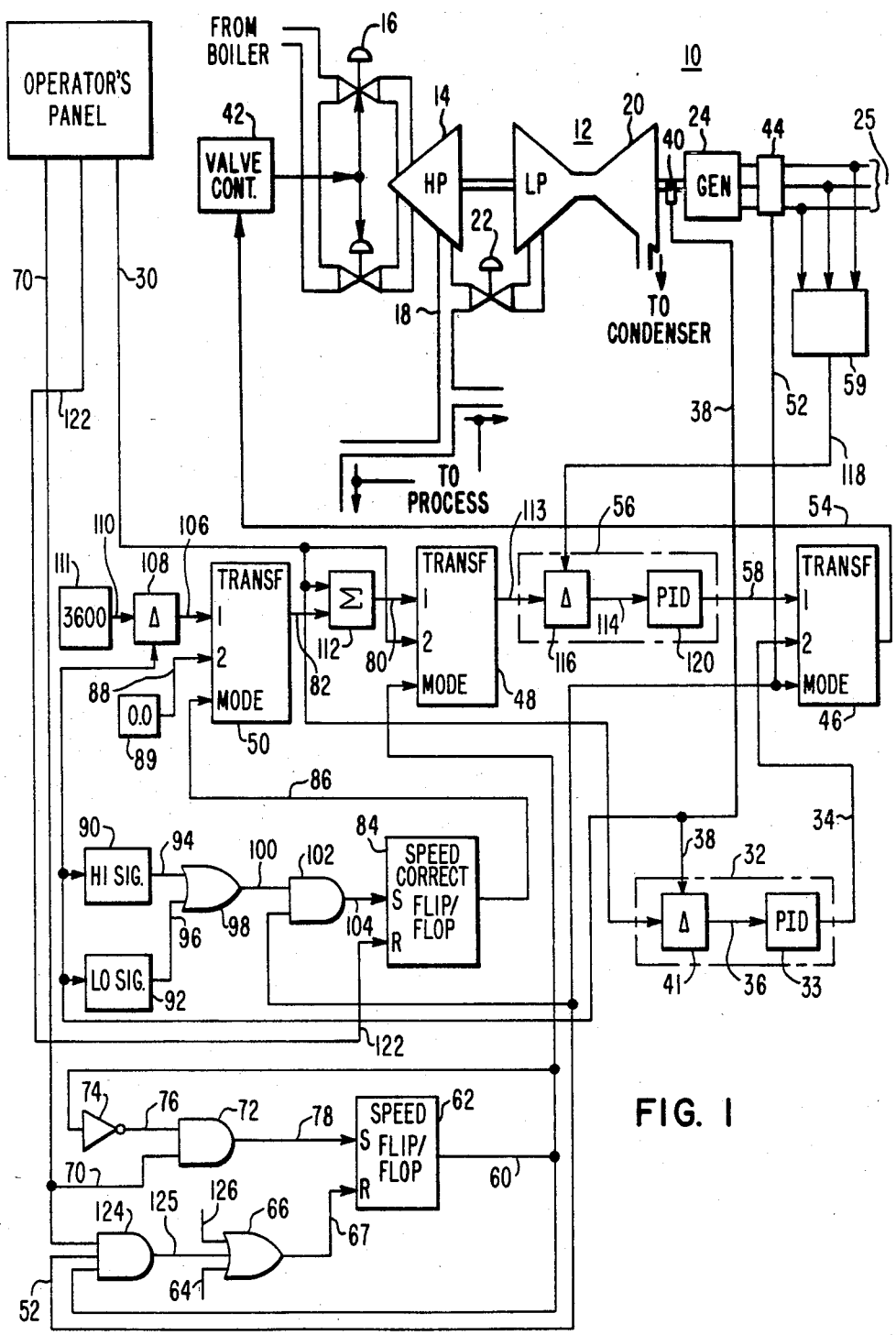
FIG. 1 shows an extraction turbine plant operated by a control system arranged in accordance with the principles of the invention.

With reference to FIG. 1, an extraction steam turbine-generator control system 10 is shown in which an extraction turbine 12 is fed with inlet steam at a fixed temperature and pressure from a boiler (not shown) which enters at the high pressure (HP) end 14 of the extraction turbine 12 through the upper and lower control valves 16. The steam then exits the seventh stage of the HP end 14 to the industrial process steam header 18 and to the low pressure (LP) end 20 of the extraction turbine 12. Maximum process steam flow corresponds to a minimum opening of the extraction valve 22. However, the extraction valve 22 is kept from fully closing to maintain a flow of cooling steam to the LP section 20 of the extraction turbine 12, which overcomes the heat generated by the friction of the moving LP blades in the atmosphere of the LP section 20. An electric power generator 24 is coupled to the turbine shaft for production of megawatts on the plant power distribution system 25 for use in the industrial process, or possibly for sale to the electric utility power grid (not shown).

In the initial system operating mode, the extraction turbine 12 is started in a conventional manner and is operating below synchronous speed with the extraction valve 22 wide open, corresponding to no extraction steam demand. A speed control loop maintains the speed selected by the operator via the speed control raise/lower pushbuttons 26 and in/out split-lens pushbuttons 27 on the operator's panel 28 (see FIG. 2). The reference demand signal 30 representing the selected speed is fed from the operator's panel 28 to speed controller 32 which generates in PID (PIDVLIM) functional control block 33 a speed setpoint signal 34 as a proportional plus integral plus derivative function of the speed error signal 36. The speed error signal 36 is the difference between the reference demand signal 30 and the speed feedback signal 38 from the speed transducer 40, as determined by the delta (DBDLTA) functional control block 41. The speed setpoint signal 34 is ultimately fed to a valve controller 42, typically an electrohydraulic valve servo and servo driver loop, for positioning the control valves 16 so as to achieve the speed required by the reference demand signal 30. When the operator has brought the extraction turbine 12 up to synchronous speed, 3600 rpm, he then checks all the normal criteria used to synchronize the extraction turbine 12 before closing the main generator breaker 44 tying the generator 24 to the local plant power distribution system 25.

Assuming the local plant power distribution system 25 was already tied to the utility power grid prior to closing the main generator breaker 44, the extraction turbine-generator 12 would now be synchronized with the utility power grid such that its speed would be determined by the utility system frequency. At this point, the speed control which allowed for synchronization would no longer be necessary. The present invention initiates a transfer from the speed control loop into the load control loop so that the megawatt output of the generator 24 can be controlled. This is accomplished by the transfer (TRANSF) functional control block 46. This functional control block 46 is typical of the other transfer functional control blocks 48 and 50, each of which has an algorithm for transfer of one of two analog inputs. Based on a logical state of a mode signal, each transfer functional control block 46, 48 and 50 gates out one of its two analog input signals as its analog output signal. When the mode signal is in a "high" logical state, the signal on input 1 is gated out as the output signal. When the mode signal is in a "low" logical state, the signal on input 2 is gated out as the output signal.

During the turbine synchronization procedure and prior to closing of the main generator breaker 44, the contact sensing logic control signal 52 corresponding to the position of the main generator breaker 44 is in a "low" logical state. Therefore, the mode signal on the transfer functional control block 46 is also in a "low" logical state. As a result, the speed setpoint signal 34 will be gated out of the transfer functional control block 46 to establish the control valve setpoint signal 54 to the valve controller 42. However, once the main generator breaker 44 closes, the contact sensing logic control signal 52 will go to a "high" logical state, such that the transfer functional control block 46 will now gate input 1 as its output, automatically transferring the system from a speed control mode to a load control mode. The speed control loop is no longer operating at this point. The megawatt controller 56, through the megawatt setpoint signal 58, will continue to maintain the electric power output measured by the megawatt transducer 59 in accordance with the level of the reference demand signal 30.

The reference demand signal 30 originates in the operator's panel 28 and is provided as input 2 of the transfer functional control block 48. The mode signal of this transfer functional control block 48 is the "speed in" logic control signal 60 (SPDIN), which is in a "low" logical state because of the operation of the speed flip-flop 62. The speed flip-flop (SRFLOP) functional control block 62 is in the reset state because it has received an indication that the generator breaker 44 has just closed. This indication is provided in the form of a momentarily "high" logic control signal 64 which is provided to the OR functional control block 66 such that a "high" logic control signal 67 momentarily appears on the reset input of the speed flip-flop 62. This logic control signal 67, in its momentarily "high" logical state, resets the state of the flip-flop 62 to provide a "low" SPDIN logic control signal 60. Then the control signal 67 returns to a "low" logical state. The "low" logical state of logic control signal 60 in turn causes the transfer functional control block 48 to gate out the reference demand signal 30 as the reference signal to the megawatt controller 56.

The isochronous control operation is now described. As indicated earlier, if the local plant power distribution system 25 becomes separated from the utility power grid while the turbine-generator 12 is in the load control mode, no direct sensing of this separation will occur. The detrimental effect of this separation will be noticed in a disturbance to the speed of the turbine 12 and the system frequency. If, for example, prior to such a separation the extraction turbine 12 were generating power in excess of the local plant requirements, this excess power would be taken up by the utility power grid. Once separated, this excess power capability would translate into an undesired increase in the turbine speed and a disturbance in the system frequency. If unchecked, the local plant power distribution system 25 would disturb the industrial process. Therefore, the present invention provides automatic speed correction to maintain the appropriate system frequency on the local plant power distribution system 25.

The present invention provides an operator-selectable speed corrector which can be placed into operation while the utility power grid is still connected, such that system frequency correction can be obtained automatically should the local plant power distribution system 25 become separated from the utility power grid. The operator must choose to have the speed corrector in service prior to the occurrence of such a separation. As mentioned earlier, in the prior art, no provision was made for allowing a speed control loop to be operable while the extraction turbine-generator 12 was tied to the utility power grid. The generation capability of the extraction turbine 12 is considered relatively small in comparison to the utility generation capability, and therefore a speed control loop on the extraction turbine was not provided since it could not affect the overall system frequency while the utility power grid was the determining factor.

If the operator chooses to place the speed corrector in service, operator selection of the speed request pushbutton 27 on the operator's panel 28 (see FIG. 2) will cause the SPDPBREQUEST logic control signal 70 to momentarily go to a "high" logical state and feed this as an input to the AND functional control block 72. Just prior to placing the speed corrector in service, the SPDIN logic control signal 60 is in a "low" logical state as mentioned earlier. Because of this, the inverter (NOTIN) functional control block 74 will output a "high" logic control signal 76 to the AND functional control block 72. With both inputs in a "high" logical state, the AND functional control block 72 will output a momentarily "high" logic control signal 78 which will be placed on the set input of the speed flip-flop. Since the reset input has a "low" logic control signal 67 as earlier stated, the speed flip-flop 62 will set the SPDIN logic control signal 60 in a "high" logical state, placing the speed corrector in service.

Once the speed corrector has been placed in service, regardless of the tie between the utility power grid and the local plant power distribution system 25, the speed corrector will operate to insure that the turbine speed is within certain predetermined limits by examining the actual speed of the turbine and acting to correct it should it exceed or fall below the predetermined limits. The "high" logical state of the SPDIN logic control signal 60 will cause the mode signal of the transfer functional control block 48 to gate out the speed-corrected reference demand signal 80 on input 1. This signal is equal to the sum of the reference demand signal 30 and a speed correction factor 82. The speed correction factor 82 has one of two values, depending upon the system operating conditions.

Initially, the speed correct flip-flop 84 operates in the reset state which places a "low" logic control signal 86 on the mode input to the transfer functional control block 50. As a result, the transfer functional control block will gate out input 2 (the null signal 88) as its output, and the first value of the speed correction factor 82 will be zero. The null signal 88 is provided by the analog value generator (AVALGEN) functional control block 89. This means that although the speed corrector is in service, the reference demand signal 30 is not modified by the speed correction factor 82 and maintains its original value.

However, the speed corrector monitors the actual turbine speed in the high signal limit and low signal limit (HISIGMTV and LOSIGMTV) functional control blocks 90 and 92. The high signal limit and low signal limit functional control blocks 90 and 92 respectively determine whether the speed feedback signal 38 exceeds or falls below the desired turbine speed of 3600 rpm by comparing the speed feedback signal 38 to preset upper and lower limits. Typically these limits form a deadband of 40 rpm above or below 3600 rpm, for a total deadband of 80 rpm. If either of these signal limit functional control blocks 90 or 92 determines, respectively, the speed feedback signal 38 to be beyond these respective limits, a "high" logic control signal 94 or 96 will be output into the OR functional control block 98, such that a "high" logic control signal 100 will be placed on one input of the AND functional control block 102. With the main generator breaker 44 closed, both inputs to this AND functional control block 102 will be in a "high" logical state, such that the AND functional control block 102 will output a "high" logic control signal 104 to the set input of the speed correct flip-flop 84, thus setting its output 86 "high" and causing the mode signal on the transfer functional control block 50 to gate input 1 as its output. The signal on input 1 of the transfer functional control block is a speed error signal, which is formed by comparing, in the delta functional control block 108, the actual speed feedback 38 with the analog signal 110 representing the desired turbine synchronous speed of 3600 rpm from the analog value generator 111. Thus, the second value of the speed correction factor 82 will be the speed error signal 106, which will be added to the reference demand signal 30 in the summer (SUM2) functional control block 112 to form the new speed-corrected reference demand signal 80 which is then applied to the megawatt controller 56 via the transfer functional control block 48 output signal 113.

When the speed-corrected reference demand signal 80 is presented to the megawatt controller 56, an error signal 114 will be generated in the delta functional control block 116. This is because the existing drift in speed away from 3600 rpm is accompanied by a drift in megawatt output, and the existing megawatt level indicated by the megawatt feedback signal 118 will not correspond to megawatt level called for by the speed-corrected reference demand signal 80 now being applied. Therefore the megawatt controller 56 will output a proportional plus integral plus derivative function of the error signal 114, implemented by the PID functional control block 120. This megawatt setpoint signal 58 is applied to input 1 of the transfer functional control block 46, and because the main generator breaker 44 is closed, the "high" logic control signal 52 from the main generator breaker 44 will cause the mode signal to gate out input 1 as the control valve setpoint signal 54. The control valve setpoint signal 54, having thus been adjusted by the speed corrector, will operate with the valve controller 42 to position the control valves 16 in accordance with the necessary correction.

Once the plant operator becomes aware of the action of the speed corrector in bringing the turbine back to synchronous speed, he can choose to reset the speed corrector for another operation. This would be the case if the operator is aware that the local plant power distribution system 25 has again become connected to the utility power grid so that the utility system frequency again becomes the determining factor governing turbine speed. To reset the speed corrector, the operator pushes the speed corrector reset pushbutton 121 on the operator's panel 28 (see FIG. 2), placing a momentarily "high" logic control signal 122 on the reset input to the speed correct flip-flop 84. This will reset the speed correct flip-flop and set the mode signal on the transfer functional control block 50 in a "low" logical state causing the null signal 88 to be gated out as the speed correction factor 82 so that no speed correction is obtained. At this point, assuming that other system operating conditions remain the same, if the speed of the turbine 12 should again go beyond the predetermined limits, the speed corrector will automatically operate once again.

As mentioned previously, availability of the speed corrector was made possible by operator selection of this feature at the operator's panel 28, using the speed request pushbutton 27. This same speed request pushbutton 27 can be used to deactivate the speed corrector. If the speed corrector was already operating, the SPDIN logic control signal 60 would be in a "high" logical state. Therefore, the AND functional control block 124 would have this "high" logic control signal 60 as one of its inputs. If in addition, the main generator breaker 44 was closed, an additional input 52 to this AND functional control block 124 would be in the "high" logical state. The third input to this AND functional control block 124 comes from the speed request pushbutton 27. Under these operating conditions, operator selection of this pushbutton will place a momentarily "high" logic control signal 70 on the AND functional control block 124 and a "high" logic control signal 125 will be output to the OR functional control block 66 which will also output a momentarily "high" logic control signal 67 to the reset input of the speed flip-flop 62. This will result in the SPDIN logic control signal 60 going to a "low" logical state, thus deactivating the speed corrector.

Two other system operating conditions will result in deactivation of the speed corrector. The first of these is represented by the speed channel failure logic control signal 126 to the OR functional control block 66 feeding the reset input of the speed flip-flop 62. If the integrity of the speed feedback signal 38 is compromised, the speed channel failure logic control signal 126 will go to a "high" logical state, resetting the speed flip-flop 62 and deactivating the speed corrector. This protects against the situation in which the speed feedback signal 38 has become unreliable, such that the speed correction feature could not operate properly. The other system operating condition in which the speed corrector is deactivated is represented by the logic control signal 64 indicating that the main generator breaker 44 was open and is now closed. This accounts for the situation in which the main generator breaker has just closed and the system has just entered the load control mode. In order to force the plant operator into making a conscious decision regarding the speed corrector, each time the main generator breaker 44 closes, a momentarily "high" logic control signal 64 will be placed on the OR functional control block 66. This will momentarily place a "high" logic control signal 67 on the reset input to the speed flip-flop 62, thus resetting it and deactivating the speed corrector. Therefore, the speed corrector will automatically become unavailable on each such occasion. However, the operator may choose to place the speed corrector in service at this time by using the speed request pushbutton 27 as previously described.

Figure 2:
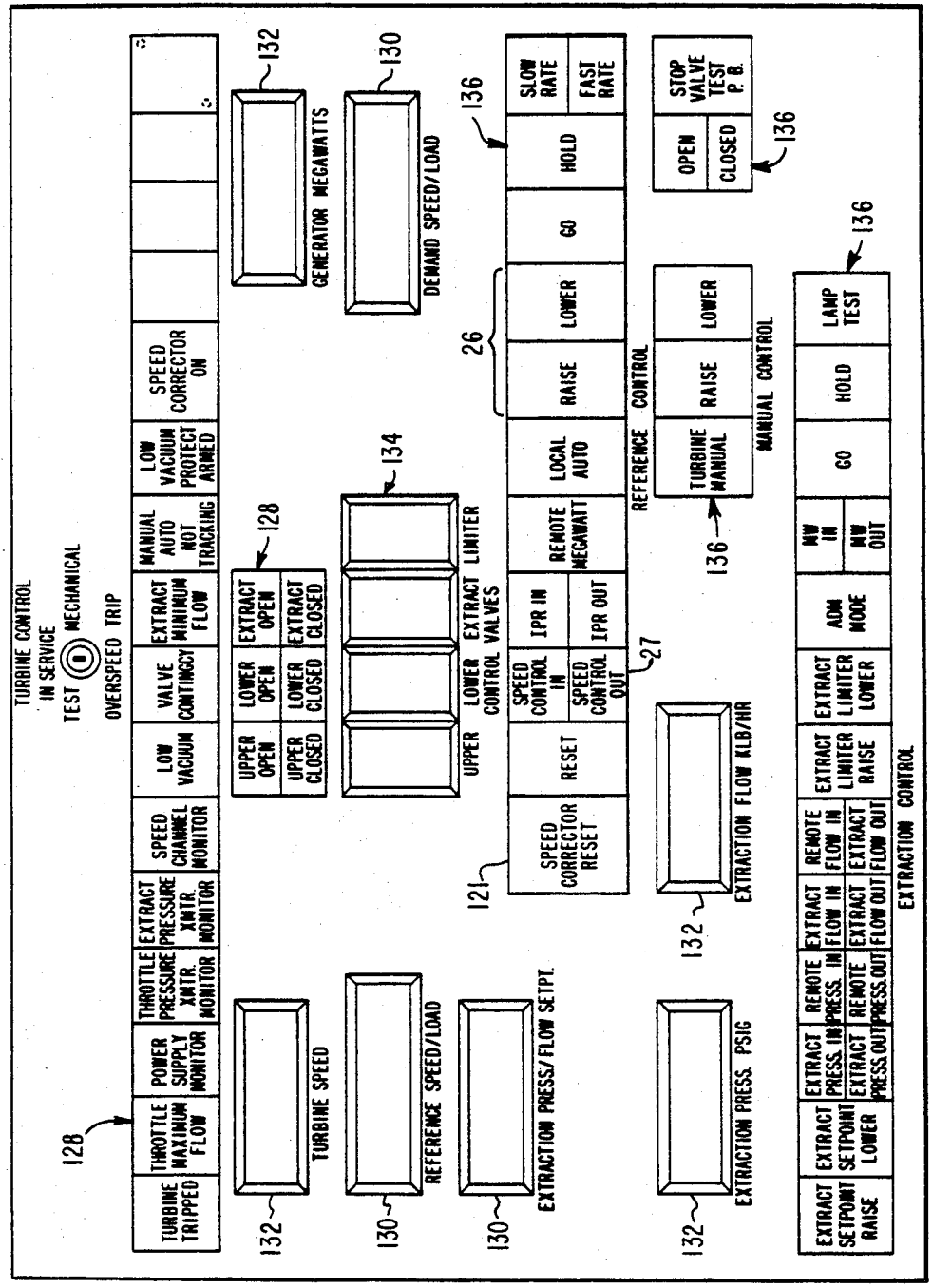
FIG. 2 shows a detail of the operator's panel portion of the present invention.

FIG. 2 shows a detail of the operator's panel 28 portion of the present invention. The panel 28 includes an annunciator display 128 indicating system abnormalities several digital readout displays, a group 130 indicating desired system operation levels and a group 132 indicating actual system operation levels, valve position panel meters 134, and a series of control pushbuttons 136 for megawatt control, extraction control and manual control. The control pushbuttons 136 allow the operator both to select the system operation mode and to establish the desired level of operation within the selected mode.

In the preferred embodiment, the turbine control system incorporates use of a single-board sixteen-bit microprocessor and an input and output interface having analog and digital conversion capability suitable for use in process environments, such as the MTCS-20 TM turbine control system, sold by the Westinghouse Electric Corporation. This microprocessor-based turbine control system has the inherent advantage of freedom from drift in calibration of components, along with ease of start-up and reduced maintenance requirements.

Figure 3:
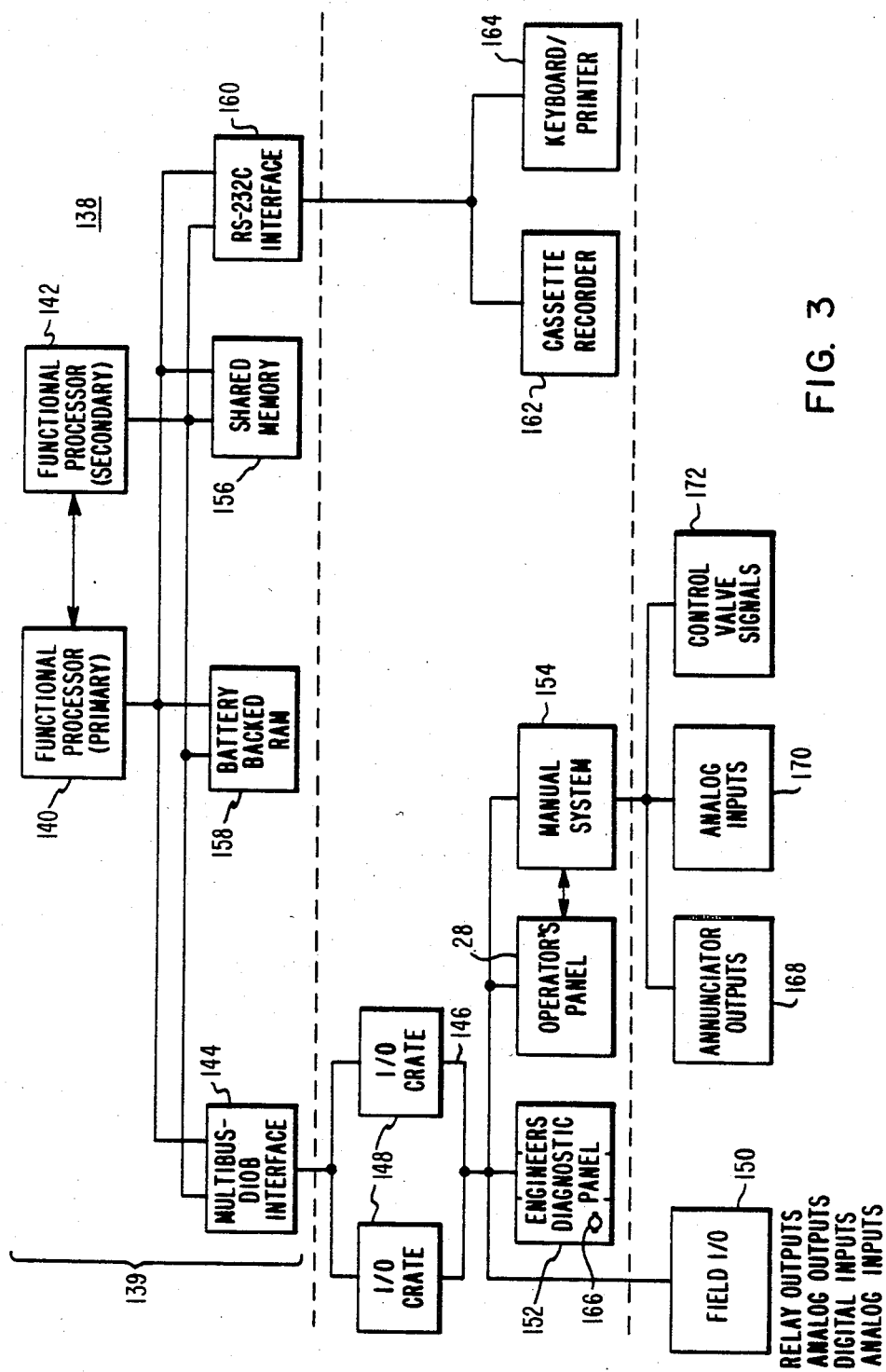
FIG. 3 shows a typical configuration of a microprocessor-based extraction turbine control system employed in the system of FIGS. 1 and 2.

A typical MTCS-20 TM turbine control system hardware configuration 138 is shown in FIG. 3. The MTCS-20 TM turbine control system uses a standard WDPF TM Multi-bus ® chassis configuration 139 with six printed circuit cards and with Westinghouse Q-line I/O, all of which is disclosed in a series of patent applications entitled "Houser et al.", all assigned to the present assignee (Serial Nos. 508,951; 508,795; 508,771; 509,122; 508,769; 509,071; 509,251 and 508,770, all filed June 29, 1983 and 531,821, filed Sept. 13, 1983) and incorporated herein by reference. The pertinent part of these applications is the portion dealing with the "drop overview" as the MTCS-20 TM turbine control system is currently sold by Westinghouse as a stand-alone controller not connected to a data highway. ®Multibus is a registered trademark of Intel Corp. MTCS-20 TM and WDPF TM are trademarks of Westinghouse Electric Corporation and Q-line is a series of printed circuit cards sold by Westinghouse Electric Corporation.

The dual functional processors 140 and 142 give the MTCS-20 TM turbine control system its first level of redundancy. The primary processor 140 is responsible for control loop execution while the normal function of the secondary processor 142 is tuning of the controller, listing the control loop, and displaying control parameters. If the primary processor 140 fails, the secondary processor 142 will automatically begin executing the control loop where the primary processor 140 left off. These two boards also contain duplicate sets of the algorithm library, which is described further herein.

The ®Multibus-DIOB interface card 144 gives the processors access to the I/O system. The Q-Line I/O bus 146 allows mixing of printed circuit point cards of any style anywhere on the bus 146. These cards are located in the I/O crates 148 and can be analog or digital, input or output, in any combination, and can accommodate a large variety of signal types. In the MTCS-20 TM turbine control system 138 these cards provide the interface to the field I/O signal group 150, the engineer's diagnostic panel 152, the operator's panel 28, and the manual system 154.

Two memory components of the MTCS-20 TM turbine control system 138 perform separate functions. A shared-memory board 156 is a 128K RAM board providing communication between the two functional processors 140 and 142. A battery-backed RAM board 158 is a 16K memory board on which the software application program for the control loops is stored. It retains its contents for up to 3 hours following a loss of power.

The last card in the ®Multibus chassis 139 is an RS-232C interface board 160 which interfaces a cassette recorder 162 used for permanent storage of the software application program for the control loops, and a keyboard/printer 164 used for entering, changing, and tuning the control loops.

The second level of redundancy in the MTCS-20 TM turbine control system 138 is an analog system, the manual system 154. It protects against failure of the digital system, in which case it would be automatically switched into operation to take control of the turbine. It also permits the plant operator to maintain control, while an engineer changes a digital control loop, by allowing the operator to manually position the turbine control and extraction valves 16 and 22 from the same operator's panel 28 used when the digital system is in control. It also constantly monitors the turbine speed and, in case of an overspeed condition, closes the turbine valves regardless of which system is in control.

The two I/O crates 148 can each hold up to 12 Westinghouse Q-Line I/O point cards. These cards are periodically polled by the software and all process information is retained in registers on the individual point cards. These registers appear as memory locations to the digital system which obtains data through memory accesses and outputs data by memory store commands (memory-mapped I/O). Thus the latest process information is always available to the system and the time response is not degraded by intermediate data handling or buffering.

Three point cards are dedicated to the engineer's diagnostic panel 152. This panel consists of three modules that allow the engineer to monitor the status of the diagnostic alarms, control the mode of the digital system, and display the output of any two system signals. The mode control module in the engineer's diagnostic panel 152 permits an engineer to load a control program, tune algorithms in the loop, or display parameters on the display module. The mode control module provides security from unauthorized use by a two-position keylock switch 166.

The field I/O signal group 150 is made up of the I/O signals from the field I/O hardware which includes field instrumentation such as feedback transducers 40 and 59 in FIG. 1, and field actuators that are located on the extraction turbine and the associated steam flow piping. The annunciator output signal grouping 168 indicates system abnormalities and is typically tied to multiple annunciator display panels in the control room or elsewhere. The analog input signal grouping 170 is segregated and tied directly to the manual system 154 so that in the event of a loss of the digital control system, essential signals for manual control are available. The control valve signal grouping 172 includes the valve servo position loop signals to and from the servo actuators which tie into the valve controller 42 (see FIG. 1).

The software application program for the control loop of FIG. 1 is furnished in the MTCS-20 TM microprocessor in the form of software application program algorithms based on the use of modular functional control blocks. The functional blocks are designed to replace tasks which a typical analog or digital control loop needs to perform. The set of available functional control blocks forms the algorithm library and includes arithmetic blocks, limit blocks, control blocks, I/O blocks, auto/manual blocks, (for manual setpoint entry and control), and miscellaneous blocks. The miscellaneous category includes functions for generating analog and digital values, generating polynomial functions, gating one of two analog signals based on the logic state of a mode signal, time delays, etc.

The MTCS-20 TM turbine control system is designed for interactive entry of functional control blocks on a line-by-line basis, to form the application program.

Each line of the application program consists of the functional control block number, the algorithm name (shown in capital letters enclosed by parentheses in the specification and shown in the algorithm library Appendix A) corresponding to that functional control block, and each of the parameter locations forming the arguments or inputs to that algorithm. Each functional control block chosen by the operator and listed on a line of the application program is task-specific, with only one output, which provides a high degree of flexibility and ease of changing. A translator handles the functional control blocks in the order in which they were entered by the operator. It translates the algorithm name of the functional control block, which the operator understands, into a series of data blocks in the pre-specified operator-chosen order so that each data block has a block number, algorithm number, parameter location, parameter location, parameter location, etc. for as many parameters as that particular algorithm requires. The translator also checks the syntax of the operator-entered data, and thereby preprocesses the application program for block-sequential, run-time interpretation by an interpreter. The interpreter executes the application program in the functional processor and works on the series of data blocks which the translator has created. The interpreter calls the algorithms in the order in which they were entered, corresponding to the lines of the application program. The interpreter also routes the answers generated by each algorithm to the correct location in memory for use by later blocks in the application program. The use of a run-time interpreter eliminates compiling, thereby saving time and increasing the flexibility and ease of programming. The completion cycle time of the control loop is user-selectable.

Appendix A contains a preferred algorithm library set for use with the present invention. Appendix B contains the preferred application program listing for use with the present invention. Appendix C contains an address label conversion table for locating the DIOB address of digital and analog input and output labels used in the preferred application program listing. Appendix D contains a set of Q-line card types used for specific algorithms in the preferred algorithm library.

ABSVAL

ABSOLUTE VALUE OF AN INPUT

OPERATION

The output is the absolute value of the input.

VARIABLES

| Variable | Description |
|---|---|
| IN1 | Analog value |
| OUT | Analog value |

SYMBOL

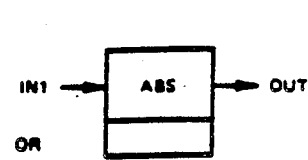

TUNING CONSTANTS

No tuning constants are used in this algorithm.

MATHEMATICS

OUT = ABS(IN1)

PROGRAMMING LANGUAGE

This algorithm is implemented using the PASCAL programming language.

AND2

LOGICAL AND GATE WITH TWO INPUTS

OPERATION

The output equals the logical AND of two inputs; that is, both inputs must be TRUE for the output to be TRUE.

SYMBOL

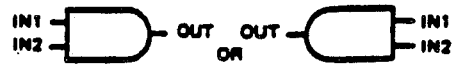

VARIABLES

| Variable | Description |
|----------|-------------|
| IN1 | Digital signal |
| IN2 | Digital signal |
| OUT | Digital signal |

TUNING CONSTANTS

No tuning constants are used in this algorithm.

MATHEMATICS

OUT = IN1 AND IN2

PROGRAMMING LANGUAGE

This algorithm is implemented using the Assembly programming language.

ANIN

INPUT ANALOG VALUE FROM DIOB

OPERATION

Out equals the value of the specified card type at the specified DIOB address which is indicated by an analog address label.

VARIABLES

| Variable | Description |
|----------|-------------|
| A-ADDR | Analog input address label (refer to Appendix C) |
| CARDTP | Card type (refer to appendix D) |
| OUT | Analog value |

TUNING CONSTANTS

No tuning constants are used in this algorithm.

MATHEMATICS

No mathematics described this algorithm.

PROGRAMMING LANGUAGE

This algorithm is implemented using the PASCAL programming language.

ANOUT

OUTPUT ANALOG VALUE TO DIOB

OPERATION

Input analog value if output to specified card type at specified CIOB address which is indicated by analog address lable.

VARIABLES

| Variable | Description |
|---|---|
| IN1 | Analog Value |
| A-ADDR | Analog Output Address Label (refer to Appendix C) |
| CARDTP | Card Type (refer to Appendix D) |

TUNING CONSTANTS

No tuning constants are used in this algorithm.

MATHEMATICS

No mathematics describe this algorithm.

PROGRAMMING LANGUAGE

This algorithm is implemented using the PASCAL programming language.

AND8

LOGICAL AND GATE WITH EIGHT INPUTS

OPERATION

The output equals the logical AND of eight inputs; i.e., all eight inputs must be TRUE for the output to be TRUE. If less than eight inputs are present, one or more of the existing signal names may be repeated until all eight inputs have an assigned name.

SYMBOL

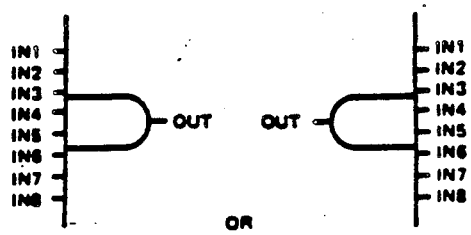

VARIABLES

| Variable | Description |
|---|---|
| IN1 | Digital signal |
| IN2 | Digital signal |
| IN3 | Digital signal |
| IN4 | Digital signal |
| IN5 | Digital signal |
| IN6 | Digital signal |
| IN7 | Digital signal |
| IN8 | Digital signal |
| OUT | Digital signal |

TUNING CONSTANTS

No tuning constants are used in this algorithm.

MATHEMATICS

OUT = IN1 AND IN2 AND IN3 AND IN4 AND IN5 AND IN6 AND IN7 AND IN8

PROGRAMMING LANGUAGE

This algorithm is implemented using the Assembly programming language.

AVG4W

AVERAGE OF FOUR WEIGHTED INPUTS

OPERATION

Output equals the average of four weighted inputs. Each input is independently gained. The sum is then divided by four. If averaging of more or less than four inputs is desired, use algorithm AVGNW or AVG2W.

VARIABLES

| Variable | Description |
|---|---|
| IN1 | Analog value |
| IN2 | Analog value |
| IN3 | Analog value |
| IN4 | Analog value |
| OUT | Analog value |

SYMBOL

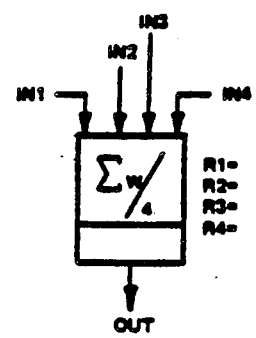

MATHEMATICS

OUT = (WT1 × IN1 + WT2 × IN2 + WT3 × IN3 + WT4 × IN4)/4

TUNING CONSTANTS

| Tuning Constant | Mnemonic | Description |
|---|---|---|
| R1 | WT1 | Weighting factor or gain on IN1 |
| R2 | WT2 | Weighting factor or gain on IN2 |
| R3 | WT3 | Weighting factor or gain on IN3 |
| R4 | WT4 | Weighting factor or gain on IN4 |

Note (Weighting factor or gain can be + or −)

PROGRAMMING LANGUAGE

This algorithm is implemented using the PASCAL programming language.

AVALGEN
(Analog Value Generator)

Description

The output is the analog value stored in the tuning constant (VALU). This value is a set point or bias to other algorithms.

Programming Language

PASCAL

Function

OUT = VALU

Symbol

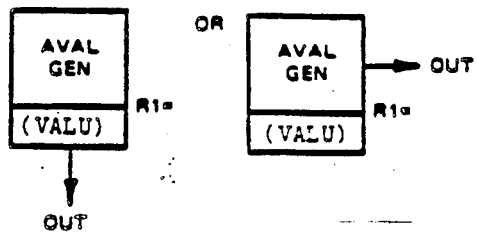

DBDLTA

DIFFERENCE BETWEEN TWO INPUTS WITH DEADBAND

OPERATION

If the absolute value of the difference of two inputs is less than or equal to the deadband, the output equals zero. Otherwise, the output equals the difference plus the deadband where the difference is less than zero, or the output equals the difference minus the deadband where the difference is greater than zero. The difference equals IN1 − IN2.

SYMBOL

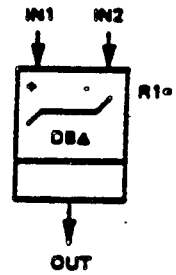

VARIABLES

| Variable | Description |
|---|---|
| IN1 | Analog value |
| IN2 | Analog value |
| OUT | Analog value |

TUNING CONSTANTS

| Tuning Constant | Mnemonic | Description |
|---|---|---|
| R1 | DBAN | Deadband |

MATHEMATICS

```
TEMP = IN1 - IN2
IF ABS (TEMP) < DBAN
THEN OUT = 0.0
ELSE
IF TEMP < 0.0
THEN OUT = TEMP + DBAN
ELSE OUT = TEMP - DBAN
``` where:

TEMP = local temporary Real variable

PROGRAMMING LANGUAGE

This algorithm is implemented using the PASCAL programming language.

DBEQUALS

DEVIATION MONITOR BETWEEN TWO VARIABLE INPUTS

OPERATION

This high/low comparator monitors two analog input values. If the absolute value of the difference between the signals exceeds the deadband value, the digital output is set TRUE; otherwise, the output is false.

SYMBOL

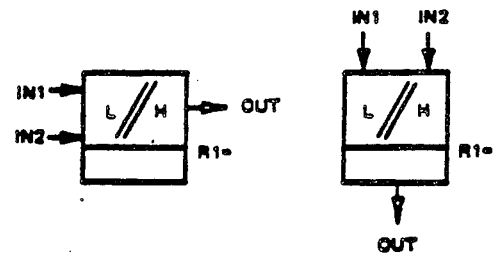

VARIABLES

| Variable | Description |
|---|---|
| IN1 | Analog value |
| IN2 | Analog value |
| OUT | Digital output |

TUNING CONSTANTS

| Tuning Constant | Mnemonic | Description |
|---|---|---|
| R1 | DBAN | Deadband |

MATHEMATICS

TEMP = IN1 − IN2
IF ABS (TEMP) < DBAN
THEN OUT = FALSE
ELSE OUT = TRUE where:

TEMP = local temporary Real variable

PROGRAMMING LANGUAGE

This algorithm is implemented using the PASCAL programming language.

DGIN

INPUT DIGITAL SIGNAL FROM DIOB

OPERATION

Out equals the value of a digital signal at a specified DIOB address indicated by a digital address label.

VARIABLES

| Variable | Description |
|---|---|
| D-ADDR | Digital Address Label (refer to Appendix C) |
| OUT | Digital Signal |

TUNING CONSTANTS

No tuning constants are used in this algorithm.

MATHEMATICS

No mathematics describe this algorithm.

PROGRAMMING LANGUAGE

This algorithm is implemented using the PASCAL programming language.

DGOUT

OUTPUT DIGITAL SIGNAL TO DIOB

OPERATION

Input digital signal output to specified DIOB address which is indicated by a digital address label.

VARIABLES

| Variable | Description |
|---|---|
| IN1 | Digital Signal |
| D-ADDR | Digital Address Label (refer to Appendix C) |

TUNING CONSTANTS

No tuning constants are used in this algorithm.

MATHEMATICS

No mathematics describe this algorithm.

PROGRAMMING LANGUAGE

This algorithm is implemented using the PASCAL programming language.

DISPLAYA

DISPLAY ANALOG VALUE ON BAR GRAPH A

OPERATION

The input analog value is displayed at the operator's panel on Bar Graph A

VARIABLES

| Variable | Description |
|---|---|
| IN1 | Analog Value |
| OUT | Displayed on Bar Graph A |

TUNING CONSTANTS

| Tuning Constant | Mnemonic | Description |
|---|---|---|
| IN1 | | |

MATHEMATICS

No mathematics describe this algorithm.

PROGRAMMING LANGUAGE

This algorithm is implemented using the PASCAL programming language.

DISPLAYB

DISPLAY ANALOG VALUE ON BAR GRAPH B

OPERATION

The input analog value is displayed at the operator's panel on Bar Graph B

VARIABLES

| Variable | Description |
|---|---|
| IN | Analog Value |
| OUT | Displayed on Bar Graph B |

TUNING CONSTANTS

| Tuning Constant | Mnemonic | Description |
|---|---|---|
| IN1 | | |

MATHEMATICS

No mathematics describe this algorithm.

PROGRAMMING LANGUAGE

This algorithm is implemented using the PASCAL programming language.

DVALGEN

DIGITAL VALUE GENERATOR

OPERATION

The output is the digital value stored in the tuning constant VALU. This value can be used to force any digital input to any algorithm to either a TRUE or FALSE state that will remain fixed unless changed by the MMI tuning function.

SYMBOL

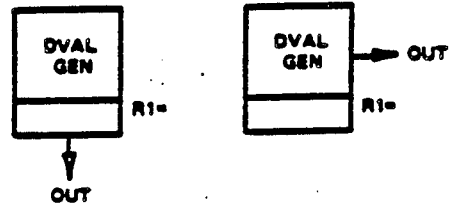

VARIABLES

| Variable | Description |
|---|---|
| OUT | Digital output value |

TUNING CONSTANTS

| Tuning Constant | Mnemonic | Description |
|---|---|---|
| R1 | VALU | Digital value (either TRUE or FALSE) |

MATHEMATICS

OUT = VALU

PROGRAMMING LANGUAGE

This algorithm is implemented using the PASCAL programming language.

GAINBI

GAIN AND BIAS AN INPUT

OPERATION

The output is equal to the input times the gain (GAIN) plus a bias (BIAS).

SYMBOL

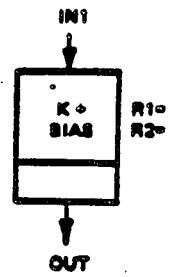

VARIABLES

| Variable | Description |
|---|---|
| IN1 | Analog value |
| OUT | Analog value |

TUNING CONSTANTS

| Tuning Constant | Mnemonic | Description |
|---|---|---|
| R1 | GAIN | Gain |
| R2 | BIAS | Bias |

Note
1. Gain or Bias can be + or −.
2. If R2 (Bias) is not specified, it will be automatically set equal to zero.

MATHEMATICS

OUT = (IN1 × GAIN) + BIAS

PROGRAMMING LANGUAGE

This algorithm is implemented using the PASCAL programming language.

HDFAIL

HARDWARE STATUS OF DIGITAL SIGNAL

OPERATION

Output signal is set if hardware status of input signal is bad; else reset.

VARIABLES

| Variable | Description |
|----------|-------------|
| IN1 | Digital Signal |
| OUT | Digital Signal |

TUNING CONSTANTS

No tuning constants are used in this algorithm.

MATHEMATICS

No mathematics describe this algorithm.

PROGRAMMING LANGUAGE

This algorithm is implemented using the Assembly programming language.

HILMT

HIGH LIMITER WITH FIXED LIMIT

OPERATION

The output is equal to the input value IN1 or the high limit value, whichever is lower.

SYMBOL

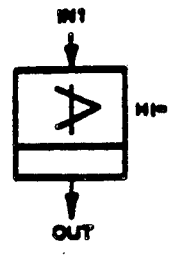

VARIABLES

| Variable | Description |
|----------|-------------|
| IN1 | Analog value |
| OUT | Analog value |

TUNING CONSTANTS

| Tuning Constant | Mnemonic | Description |
|-----------------|----------|-------------|
| HI | HILM | High limit value |

MATHEMATICS

```
IF IN1 < HILM
THEN OUT = IN1
ELSE OUT = HILM
```

PROGRAMMING LANGUAGE

This algorithm is implemented using the PASCAL programming language.

HISIGMTV

HIGH SIGNAL MONITOR WITH RESET DEADBAND AND A VARIABLE LIMIT

OPERATION

If the input value IN1 exceeds the variable setpoint input STPT, the digital flag is set TRUE. To clear the flag, the input value must be less than the setpoint input STPT minus the deadband.

SYMBOL

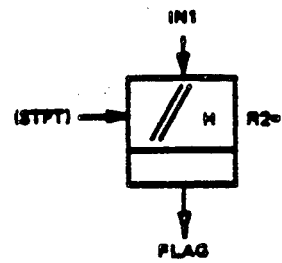

VARIABLES

| Variable | Description |
|---|---|
| IN1 | Analog value |
| STPT | Analog variable setpoint value |
| FLAG | Digital output signal |

TUNING CONSTANTS

| Tuning Constant | Mnemonic | Description |
|---|---|---|
| R2 | DBAN | Deadband in reset direction |

MATHEMATICS

```
IF FLAG = FALSE
AND IF IN1 > STPT
THEN FLAG = TRUE
ELSE
IF FLAG = TRUE
AND IF IN1 < (STPT - DBAN)
THEN FLAG = FALSE
ELSE FLAG = TRUE
```

PROGRAMMING LANGUAGE

This algorithm is implemented using the PASCAL programming language.

IBCDOUT (Outputs Inverted BCD Digits from the Functional Processor to the DIOB)

Description

This algorithm reads a real value from input IN1, converts it to binary-coded-decimal (BCD), inverts the BCD, and outputs a number of digits to the Distributed I/O Bus (DIOB). The user must specify the offset of the value in the DIOB, the number of BCD digits to write, and the bit position where the writing is to begin.

Symbol

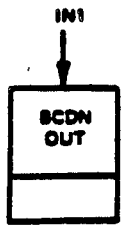
OR
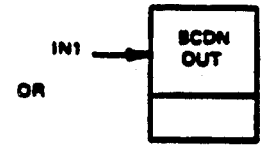

Programming Language

Assembly

LOLMT

LOW LIMITER WITH FIXED LIMIT

OPERATION

The output is equal to the input value IN1 or the low limit value, whichever is higher.

SYMBOL

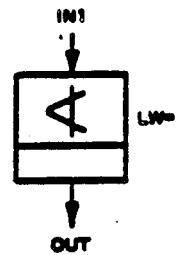

VARIABLES

| Variable | Description |
|---|---|
| IN1 | Analog value |
| OUT | Analog value |

TUNING CONSTANTS

| Tuning Constant | Mnemonic | Description |
|---|---|---|
| LW | LOLM | Low limit value |

MATHEMATICS

IF IN1 > LOLM
THEN OUT = IN1
ELSE OUT = LOLM

PROGRAMMING LANGUAGE

This algorithm is implemented using the PASCAL programming language.

LOSEL4

LOW SIGNAL SELECTOR WITH FOUR INPUTS

OPERATION

The output equals the lowest of four analog input values. If less than four input signals are present, one or more of the existing signal names must be repeated until all four inputs have an assigned name.

SYMBOL

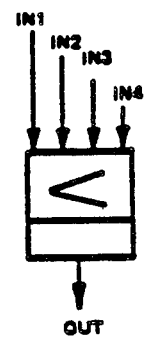

VARIABLES

| Variable | Description |
|---|---|
| IN1 | Analog value |
| IN2 | Analog value |
| IN3 | Analog value |
| IN4 | Analog value |
| OUT | Analog value |

TUNING CONSTANTS

No tuning constants are used in this algorithm.

MATHEMATICS

No mathematics describe this algorithm.

PROGRAMMING LANGUAGE

This algorithm is implemented using the PASCAL programming language.

LOSIGMTV

LOW SIGNAL MONITOR WITH RESET DEADBAND AND A VARIABLE LIMIT

OPERATION

If the input value IN1 goes below the variable setpoint input STPT, the digital flag is set TRUE. To clear the flag, the input value must be greater than the setpoint input STPT plus the deadband.

SYMBOL

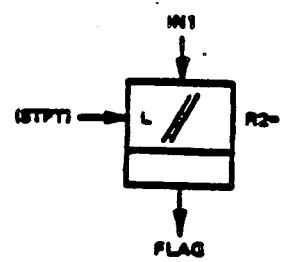

VARIABLES

| Variable | Description |
|---|---|
| IN1 | Analog value |
| STPT | Analog variable setpoint value |
| FLAG | Digital output signal |

TUNING CONSTANTS

| Tuning Constant | Mnemonic | Description |
|---|---|---|
| R2 | DBAN | Deadband in reset direction |

MATHEMATICS

IF FLAG = FALSE
AND IF IN1 < STPT
THEN FLAG = TRUE
ELSE
IF FLAG = TRUE
AND IF IN1 > (STPT + DBAN)
THEN FLAG = FALSE
ELSE FLAG = TRUE

PROGRAMMING LANGUAGE

This algorithm is implemented using the PASCAL programming language.

MEDSEL

MEDIUM VALUE SELECTOR

OPERATION

Output is equal to the medium value of three analog input values.

SYMBOL

 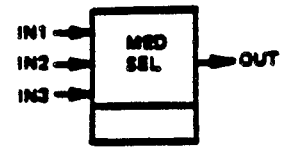

VARIABLES

| Variable | Description |
|---|---|
| IN1 | Analog value |
| IN2 | Analog value |
| IN3 | Analog value |
| OUT | Analog value |

TUNING CONSTANTS

No tuning constants are used in this algorithm.

MATHEMATICS

OUT = IN1, IF IN2 ≤ IN1 ≤ IN3 OR
IN3 ≤ IN1 ≤ IN2

OUT = IN2, IF IN1 ≤ IN2 ≤ IN3 OR
IN3 ≤ IN2 ≤ IN1

OUT = IN3, IF IN1 ≤ IN3 ≤ IN2 OR
IN2 ≤ IN3 ≤ IN1

PROGRAMMING LANGUAGE

This algorithm is implemented using the PASCAL programming language.

MULTDIV

MULTIPLIER PLUS DIVIDER

OPERATION

Output is equal to the first two inputs multiplied and divided by the third input.

VARIABLES

| Variable | Description |
|----------|-------------|
| IN1 | Analog Value |
| IN2 | Analog Value |
| IN3 | Analog Value |
| OUT | Analog Value |

TUNING CONSTANTS

No tuning constants are used in this algorithm.

MATHEMATICS

OUT: = (IN1 * IN2) / IN3

PROGRAMMING LANGUAGE

This algorithm is implemented using the PASCAL programming language.

NOTIN

LOGICAL NOT GATE

OPERATION

Output is the logical "NOT" of the input; that is:

IF IN1 = TRUE    THEN OUT = FALSE
IF IN1 = FALSE   THEN OUT = TRUE

SYMBOL

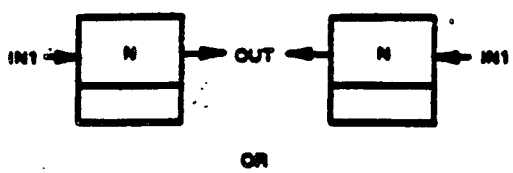

OR

VARIABLES

| Variable | Description |
|---|---|
| IN1 | Digital signal |
| OUT | Digital signal |

TUNING CONSTANTS

No tuning constants are used in this algorithm.

MATHEMATICS

OUT = NOT IN1

PROGRAMMING LANGUAGE

This algorithm is implemented using the Assembly programming language.

OR2

LOGICAL OR GATE WITH TWO INPUTS

OPERATION

The output equals the logical OR of two inputs; i.e., at least one input must be TRUE for the output to be TRUE.

SYMBOL

OR

VARIABLES

| Variable | Description |
|---|---|
| IN1 | Digital signal |
| IN2 | Digital signal |
| OUT | Digital signal |

TUNING CONSTANTS

No tuning constants are used in this algorithm.

MATHEMATICS

OUT = IN1 OR IN2

PROGRAMMING LANGUAGE

This algorithm is implemented using the Assembly programming language.

OR8

LOGICAL OR GATE WITH EIGHT INPUTS

OPERATION

The output equals the logical OR of eight inputs; i.e., at least one input must be TRUE for the output to be TRUE.

SYMBOL

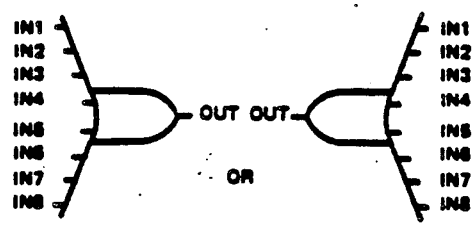

VARIABLES

| Variable | Description |
|---|---|
| IN1 | Digital signal |
| IN2 | Digital signal |
| IN3 | Digital signal |
| IN4 | Digital signal |
| IN5 | Digital signal |
| IN6 | Digital signal |
| IN7 | Digital signal |
| IN8 | Digital signal |
| OUT | Digital signal |

TUNING CONSTANTS

No tuning constants are used in this algorithm.

MATHEMATICS

OUT = IN1 OR IN2 OR IN3 OR IN4 OR IN5 OR IN6 OR IN7 OR IN8

PROGRAMMING LANGUAGE

This algorithm is implemented using the Assembly programming language.

PIDVLIM

PROPORTIONAL + INTEGRAL + DERIVATIVE CONTROLLER WITH VARIABLE LIMITS

OPERATION

This nonlinear PID Controller has two modes. When in the Tracking mode (TMOD = TRUE), the output equals the tracking input (TRIN). When TMOD = FALSE the output value is a function of the old output, input value, gain, reset and derivative. The output in this latter mode is constant only when the input = 0. It is also high and low limited by variable limit values in both modes.

SYMBOL

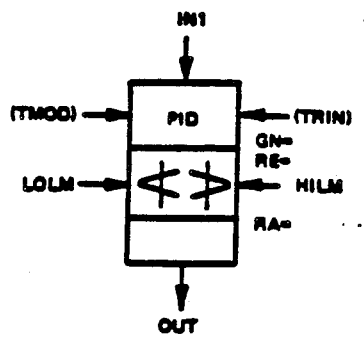

VARIABLES

| Variable | Description |
|---|---|
| IN1 | Analog value |
| OUT | Analog value |
| TRIN | Analog input; track output to this value |
| LOLM | Low limit value analog input |
| HILM | High limit value analog input |
| TMOD | Tracking request digital input |

TUNING CONSTANTS

| Tuning Constant | Mnemonic | Description |
|---|---|---|
| GN | GAIN | Gain |
| RE | RSET | Reset |
| RA | RATE | Rate |

Note (Gain can be + or −)

MATHEMATICS

IF TMOD = TRUE
THEN TEMP = TRIN
ELSE
K1 = GAIN [(TS)/(2 × RSET) + 1.0]
K2 = GAIN [(TS)/(2 × RSET) − 1.0]
K3 = GAIN [(2 × RATE)/(2 × RATE) + TS]
K4 = (2 × RATE − TS)/(2 × RATE + TS)
P1 = K1 × IN1 + K2 × OLDIN + PROPOLD
D1 = K3 × (IN1 − OLDIN) + K4 × DERVOLD
TEMP = P1 + D1
IF TEMP > HILM
THEN OUT = HILM
ELSE IF TEMP < LOLM
THEN OUT = LOLM
ELSE OUT = TEMP where:

K1, K2, K3, K4, OLDIN, PROPOLD, DERVOLD = local retained Real variables
TEMP = local temporary Real variable
TS = sampling time (DDC program loop time)

PROGRAMMING LANGUAGE

This algorithm is implemented using the PASCAL programming language.

SRFLOP

S-R TYPE FLIP-FLOP WITH 1 OUTPUT

OPERATION

SRFLOP is a memory device in which the output state is defined by the truth table below.

VARIABLES

| Variable | Description |
|---|---|
| SET | Digital Signal |
| RSET | Digital Signal |
| OUT | Digital Signal |

TUNING CONSTANTS

No tuning constants are used in this algorithm.

MATHEMATICS

```
TRUTH TABLE

SET    RESET    OUT 0       0       X
 0       1       0
 1       0       1
 1       1       0    Where X output remains in previous state.
```

PROGRAMMING LANGUAGE

This algorithm is implemented using the Assembly programming language.

SUM2

SUM OF TWO INPUTS

OPERATION

The output equals the sum of two inputs.

SYMBOL

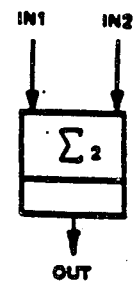

VARIABLES

| Variable | Description |
|---|---|
| IN1 | Analog value |
| IN2 | Analog value |
| OUT | Analog value |

TUNING CONSTANTS

No tuning constants are used in this algorithm.

MATHEMATICS

OUT = IN1 + IN2

PROGRAMMING LANGUAGE

This algorithm is implemented using the PASCAL programming language.

SUM4W

SUM OF FOUR WEIGHTED INPUTS

OPERATION

The output equals the sum of four inputs, each of which has a gain term. The gain terms are used to scale inputs so that the output range is the same as the input range or to weight the various inputs differently with respect to each other. If less than four input signals are present, one or more existing signals must be repeated until all four inputs have an assigned name. Adjust weighting factors accordingly.

SYMBOL

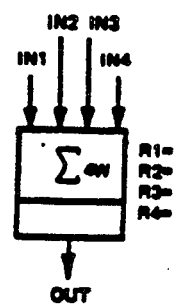

VARIABLES

| Variable | Description |
|---|---|
| IN1 | Analog value |
| IN2 | Analog value |
| IN3 | Analog value |
| IN4 | Analog value |
| OUT | Analog value |

TUNING CONSTANTS

| Tuning Constant | Mnemonic | Description |
|---|---|---|
| R1 | WT1 | Weighting factor or gain on input IN1 |
| R2 | WT2 | Weighting factor or gain on input IN2 |
| R3 | WT3 | Weighting factor or gain on input IN3 |
| R4 | WT4 | Weighting factor or gain on input IN4 |

Note (Weighting factor or gain can be + or −)

TIMEDEL

TIME DELAY FOR A LOGICAL INPUT

OPERATION

The output becomes a logical TRUE signal "X" amount of time after the input changes state from FALSE to TRUE. The "X" is equal to the delay time. The input must remain TRUE for a time interval equal to or greater than the delay time for the output to go TRUE. There is no delay in the output changing from TRUE to FALSE when the input changes from TRUE to FALSE.

SYMBOL

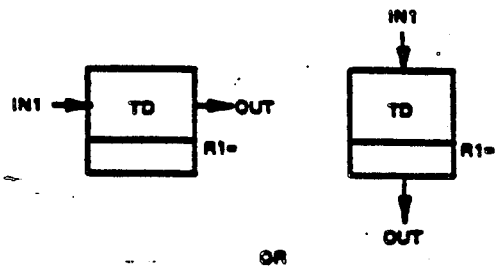

OR

VARIABLES

| Variable | Description |
|---|---|
| IN1 | Digital signal |
| OUT | Digital signal |

TUNING CONSTANTS

| Tuning Constant | Mnemonic | Description |
|---|---|---|
| R1 | TIME | Delay time |

MATHEMATICS

No mathematics describe this algorithm.

PROGRAMMING LANGUAGE

This algorithm is implemented using the PASCAL programming language.

TRACK

TRACKING BUFFER

OPERATION

In the normal mode (TMOD = FALSE), the output is equal to the analog input INSP. In the Tracking mode (TMOD = TRUE), the output is equal to the analog tracking input TRIN. During transitions from Track to normal mode, the output is ramped from the TRIN value to the INSP value at a rate in units per second specified by the decay rate.

SYMBOL

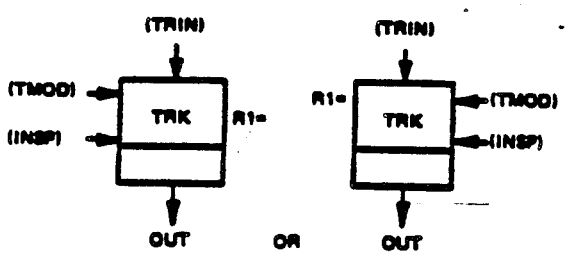

VARIABLES

| Variable | Description |
|---|---|
| INSP | Analog input that is usually passed through to output |
| TRIN | Analog value; Tracking input. (Track output to this value when TMOD = TRUE) |
| OUT | Analog output |
| TMOD | Digital signal; command to Track when signal TRUE |

TUNING CONSTANTS

| Tuning Constant | Mnemonic | Description |
|---|---|---|
| R1 | DCAY | Decay rate |

MATHEMATICS

```
IF TMOD = TRUE
THEN OUT = TRIN
ELSE
  STEP = DCAY × TS
  TDIF = INSP - TRIN
  IF ABS(TDIF) < STEP
  THEN OUT = INSP
  ELSE IF TDIF < 0.0
    THEN OUT = OLDOUT - STEP
    ELSE OUT = OLDOUT + STEP
``` where:

OLDOUT = local retained variable
STEP, TDIF = local temporary variables

PROGRAMMING LANGUAGE

This algorithm is implemented using the PASCAL programming language.

TRANSF

TRANSFER BETWEEN TWO ANALOG INPUTS

OPERATION

The output is equal to one of two analog inputs. If the digital command FLAG = TRUE, then the OUTPUT = IN1. If FLAG = FALSE, the OUTPUT = IN2.

SYMBOL

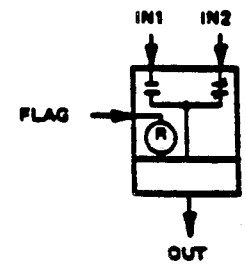

VARIABLES

| Variable | Description |
|---|---|
| IN1 | Analog value |
| IN2 | Analog value |
| OUT | Analog value |
| FLAG | Digital input signal; transfers IN1 to the output when FLAG = TRUE |

TUNING CONSTANTS

No tuning constants are used in this algorithm.

MATHEMATICS

No mathematics describe this algorithm.

PROGRAMMING LANGUAGE

This algorithm is implemented using the Assembly programming language.

XOR2

EXCLUSIVE OR OF TWO INPUTS

OPERATION

The output is the logical exclusive "OR" of the two inputs; i.e., if *either* IN1 *or* IN2 is TRUE, output is TRUE. Otherwise, output is FALSE.

SYMBOL

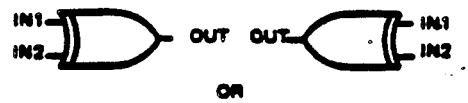

VARIABLES

| Variable | Description |
|---|---|
| IN1 | Digital signal |
| IN2 | Digital signal |
| OUT | Digital signal |

TUNING CONSTANTS

No tuning constants are used in this algorithm.

MATHEMATICS

IF IN1 AND IN2 = TRUE
THEN OUT = FALSE
ELSE OUT = IN1 OR IN2

PROGRAMMING LANGUAGE

This algorithm is implemented using the Assembly programming language.

```
ENTER: LOAD,GO,TUNE,LIST,TAPE,MSG
>LIST
*** MTCS-20tm LOOPTIME :  0.6000
*** NO DATA HIWAY
*** TOTAL BLOCKS USED :     897
BLOCK ALGNAME   PARAMETERS
----- -------   ----------
    1: AVALGEN   1.0000
    2: AVALGEN   2.0000
    5: AVALGEN   5.0000
   10: AVALGEN  10.000
   20: AVALGEN  20.000
   50: AVALGEN  50.000
   60: AVALGEN  60.000
   90: AVALGEN  90.000
   98: AVALGEN  98.000
   99: AVALGEN  99.000
  100: AVALGEN 100.00
  101: AMIN        A1.        15
  102: AMIN        A2.        15
  103: AMIN        A3.        15
  104: AMIN        A4.        15
  105: AMIN        A5.        15
  107: AMIN        A7.        15
  108: AMIN        A8.        15
  109: AMIN        A9.        15
  110: AMIN       A10.        15
  111: AMIN       A11.        15
  113: AMIN       A13.        15
  114: AMIN       A14.        15
  115: AMIN       A15.        15
  121: AMIN       A21.        15
  122: AMIN       A22.        15
  123: AMIN       A23.        15
  401: DGIN       D1
  402: DGIN       D2
  403: DGIN       D3
  404: DGIN       D4
  407: DGIN       D7
  408: DGIN       D8
  409: DGIN       D9
  410: DGIN       D10
  411: DGIN       D11
  412: DGIN       D12
  413: DGIN       D13
```

```
414: DGIN         D14
415: DGIN         D15
416: DGIN         D16
417: DGIN         D17
418: DGIN         D18
419: DGIN         D19
420: DGIN         D20
421: DGIN         D21
422: DGIN         D22
423: DGIN         D23
424: DGIN         D24
425: DGIN         D25
426: DGIN         D26
427: DGIN         D27
428: DGIN         D28
429: DGIN         D29
431: DGIN         D31
432: DGIN         D32
433: DGIN         D33
434: DGIN         D34
435: DGIN         D35
436: DGIN         D36
437: DGIN         D37
438: DGIN         D38
439: DGIN         D39
440: DGIN         D40
441: DGIN         D41
442: DGIN         D42
443: DGIN         D43
444: DGIN         D44
900: AND2         B415, B9940
901: AND2         B417, B9941
902: AND2         B419, B9942
903: AND2         B422, B9943
904: AND2         B423, B9944
905: AND2         B424, B9945
906: AND2         B427, B9946
907: AND2         B443, B9947
908: AND2         B433, B9948
909: AND2         B434, B9949
910: AND2         B435, B9950
911: AND2         B436, B9951
912: AND2         B439, B9952
913: AND2         B440, B9953
1001: AVALGEN    0.0000
1002: AVALGEN    -2.000
1003: GAINBI     B102,2.5000,-25.00
1004: GAINBI     B101,2.5000,-25.00
1005: GAINBI     B103,2.5000,-25.00
1006: GAINBI     B104,2.5000,-25.00
1007: GAINBI     B105,2.5000,-25.00
1008: GAINBI     B110,-1.000,100.00
1009: AVALGEN    -5.000
1010: NOTIN      B401
1011: AVALGEN    102.00
1012: GAINBI     B121,1.2500,-25.00
1013: GAINBI     B122,1.2500,-25.00
1014: GAINBI     B123,1.2500,-25.00
1020: NOTIN      B402
1030: NOTIN      B411
1040: NOTIN      B410
1050: NOTIN      B409
1060: NOTIN      B407
1065: NOTIN      B414
```

```
1055: NOTIN     B415
1070: AND2      B402, B9905
1080: AND2      B1020, B9900
1090: OR2       B1070, B1080
1095: AND2      B1010, B9910
1099: AND2      B401, B9915
1111: AVALGEN   -1.000
1112: AVALGEN   -1.000
1113: AVALGEN   -0.500
1114: AVALGEN   0.5000
1115: AVALGEN   0.0190
1116: AVALGEN   -0.019
1117: AVALGEN   0.0450
1119: AVALGEN   0.1390
1120: HISIGMTV  B1005, B1011,2.0000
1125: AVALGEN   125.00
1130: LOSIGMTV  B1005, B1002,2.0000
1140: HDFAIL    B103
1150: OR8       B1120, B1130, B1140, B1130, B1130, B1130, B1130, B1130
1159: AVALGEN   19.750
1160: LOSIGMTV  B1005, B1159,0.0000
1170: HISIGMTV  B1004, B1011,2.0000
1180: LOSIGMTV  B1004, B1009,2.0000
1190: HDFAIL    B101
1200: OR8       B1170, B1190, B1190, B1190, B1190, B1190, B1190, B1190
1205: NOTIN     B1200
1210: HISIGMTV  B1003, B1011,2.0000
1220: LOSIGMTV  B1003, B1002,2.0000
1230: HDFAIL    B102
1240: OR8       B1210, B1220, B1230, B1220, B1220, B1220, B1220, B1220
1250: LOSIGMTV  B1003,  B10,2.0000
1260: NOTIN     B1240
1270: AND2      B1260, B1250
1290: HISIGMTV  B1006, B1011,2.0000
1300: LOSIGMTV  B1006, B1002,2.0000
1310: HDFAIL    B104
1320: OR8       B1290, B1300, B1310, B1300, B1300, B1300, B1300, B1300
1330: TRANSF    B2637, B1006, B1320
1340: HISIGMTV  B1007, B1011,2.0000
1350: LOSIGMTV  B1007, B1002,2.0000
1360: HDFAIL    B105
1370: OR8       B1340, B1350, B1360, B1350, B1350, B1350, B1350, B1350
1380: HISIGMTV  B1007,  B99,2.0000
1390: NOTIN     B1370
1400: AND2      B1390, B1380
1410: HISIGMTV  B1012, B1011,2.0000
1420: LOSIGMTV  B1012, B1002,2.0000
1430: HDFAIL    B1012
1440: OR8       B1410, B1420, B1430, B1420, B1420, B1420, B1420, B1420
1441: DBEQUALS  B121, B1445,1.0000
1443: NOTIN     B1441
1445: TRACK     B121, B9916, B1443,0.1000
1450: HISIGMTV  B1013, B1011,2.0000
1460: LOSIGMTV  B1013, B1002,2.0000
1470: HDFAIL    B1013
1480: OR8       B1450, B1460, B1470, B1460, B1460, B1460, B1460, B1460
1491: DBEQUALS  B122, B1485,1.0000
1493: NOTIN     B1491
1495: TRACK     B122, B9917, B1493,0.1000
1490: HISIGMTV  B1014, B1011,2.0000
1500: LOSIGMTV  B1014, B1002,2.0000
1510: HDFAIL    B1014
1520: OR8       B1490, B1500, B1510, B1500, B1500, B1500, B1500, B1500
```

```
1521: DBEQUALS   B123. B1524.1.0000
1523: NOTIN      B1521
1524: TRACK      B123. B9919. B1523.0.1000
1525: OR9        B1150. B1200. B1240. B1320. B1370. B5510. B5510. B5510
1526: OR9        B1525. B1560. B1500. B1540. B1590. B1720. B1720. B1720
1530: HISIGMTV   B111. B1011.2.0000
1540: LOSIGMTV   B111. B1002.2.0000
1550: HDFAIL     B111
1560: OR9        B1530. B1540. B1550. B1540. B1540. B1540. B1540. B1540
1570: HISIGMTV   B1009. B1011.2.0000
1580: LOSIGMTV   B1009. B1002.2.0000
1590: HDFAIL     B110
1600: OR9        B1570. B1580. B1590. B1590. B1590. B1590. B1590. B1590
1610: HISIGMTV   B114. B1011.2.0000
1620: LOSIGMTV   B114. B1002.2.0000
1630: HDFAIL     B114
1640: OR9        B1610. B1620. B1630. B1620. B1620. B1620. B1620. B1620
1650: HISIGMTV   B115. B1011.2.0000
1660: LOSIGMTV   B115. B1002.2.0000
1670: HDFAIL     B115
1680: OR9        B1650. B1660. B1670. B1660. B1660. B1660. B1660. B1660
1690: HISIGMTV   B113. B1011.2.0000
1700: LOSIGMTV   B113. B1002.2.0000
1710: HDFAIL     B113
1720: OR9        B1690. B1700. B1710. B1700. B1700. B1700. B1700. B1700
1730: DBEQUALS   B109. B109.2.0000
1740: DBEQUALS   B109. B107.2.0000
1750: DBEQUALS   B109. B107.2.0000
1760: AND9       B1730. B1740. B1750. B1750. B1750. B1750. B1750. B1750
1770: HDFAIL     B107
1780: HISIGMTV   B107. B1125.2.0000
1800: OR9        B1780. B1770. B1770. B1770. B1770. B1770. B1770. B1770
1810: HDFAIL     B109
1820: HISIGMTV   B109. B1125.2.0000
1840: OR9        B1820. B1810. B1810. B1810. B1810. B1810. B1810. B1810
1850: HDFAIL     B109
1860: HISIGMTV   B109. B1125.2.0000
1880: OR9        B1860. B1850. B1850. B1850. B1850. B1850. B1850. B1850
1890: AND2       B1730. B1800
1900: AND2       B1800. B1880
1910: AND2       B1840. B1750
1920: AND2       B1800. B1840
1930: AND2       B1740. B1880
1940: AND2       B1880. B1840
1950: OR9        B1760. B1890. B1900. B1910. B1920. B1930. B1940. B1940
1960: TRANSF    B1001. B109. B1880
1970: TRANSF    B1001. B109. B1940
1980: TRANSF    B1001. B107. B1900
1990: MEDSEL    B1960. B1970. B1980
1995: AVALGEN   17.770
1996: AVALGEN   22.220
2000: TRANSF    B1001. B1990. B1950
2001: LOSIGMTV  B2000. B1999.0.0000
2002: HISIGMTV  B2000. B1999.0.0000
2003: AND9      B1010. B1020. B2001. B2002. B2002. B2002. B2002. B2002
2010: OR9       B1800. B1840. B1880. B1990. B1990. B1990. B1990. B1990
2012: DBEQUALS  B1009. B4391.2.0000
2013: NOTIN     B2015
2014: DBEQUALS  B111. B3349.2.0000
2015: AND2      B2013. B2012
2016: OR2       B2012. B2014
2017: NOTIN     B2019
2019: AND2      B2017. B2014
2020: DBEQUALS  B114. B3349.10.000
2030: DBEQUALS  B115. B3340.10.000
2035: SAINBI    B4391.-1.000.100.00
2040: DBEQUALS  B113. B2035.10.000
2050: OR9       B2020. B2030. B2040. B2040. B2040. B2040. B2040. B2040
2060: LOSIGMTV  B114. B2.1.0000
2070: HISIGMTV  B114. B99.2.0000
```

```
2080: LOSIGMTV   B115.      B2.1.0000
2090: HISIGMTV   B115.      B99.2.0000
2100: LOSIGMTV   B113.      B2.1.0000
2110: HISIGMTV   B113.      B99.2.0000
2120: OR2        B407.  B1020
2130: OR2        B2590. B2590
2135: NOTIN      B2130
2140: OR2        B2550. B2560
2145: NOTIN      B2140
2150: OR2        B2550. B2590
2160: OR2        B1150. B2570
2170: AND8       B900.  B402. B2260. B2260. B2260. B2260. B2260. B2260
2180: AND2       B900.  B2265
2185: OR2        B2180. B1090
2190: OR8        B1950. B2170. B1070. B1070. B1070. B1070. B1070. B1070
2200: AND2       B901.  B2270
2205: HISIGMTV   B1330. B2637.0.0000
2210: AND8       B901.  B2275. B2205. B2205. B2205. B2205. B2205. B2205
2220: OR8        B1320. B2120. B2200. B2200. B2200. B2200. B2200. B2200
2230: AND2       B419.  B2280
2240: AND8       B902.  B2285. B2249. B2249. B2249. B2249. B2249. B2249
2248: DBEQUALS   B1445. B3120.2.0000
2249: NOTIN      B2248
2250: OR8        B2120. B2230. B1440. B1050. B1050. B1050. B1050. B1050
2260: SRFLOP     B2185. B2190
2265: NOTIN      B2260
2270: SRFLOP     B2210. B2220
2275: NOTIN      B2270
2280: SRFLOP     B2240. B2250
2285: NOTIN      B2280
2298: DBEQUALS   B1524. B4000.2.0000
2299: NOTIN      B2298
2290: AND8       B909.  B2565. B2550. B2299. B2550. B2550. B2550. B2550
2300: AND8       B2550. B910.  B2595. B2595. B2595. B2595. B2595. B2595
2302: AND2       B909.  B2555
2308: DBEQUALS   B1485. B4000.2.0000
2309: NOTIN      B2308
2310: AND8       B911.  B2550. B2595. B2309. B2550. B2550. B2550. B2550
2320: AND2       B909.  B2550
2330: OR8        B1200. B2120. B1530. B1030. B2320. B2302. B2160. B2160
2340: AND2       B910.  B2590
2350: OR8        B2120. B1240. B2340. B2302. B2160. B2160. B2160. B2160
2360: AND2       B911.  B2590
2370: OR8        B1340. B2120. B1490. B1040. B2360. B2302. B2160. B2160
2380: AND2       B907.  B2545
2390: AND2       B2540. B907
2400: OR8        B1150. B2120. B2380. B3155. B2390. B2390. B2390. B2390
2410: AND8       B905.  B2575. B1010. B1010. B1010. B1010. B1010. B1010
2420: AND2       B905.  B2570
2430: OR8        B2420. B1095. B1065. B1065. B1065. B1065. B1065. B1065
2450: AND2       B2350. B2590
2460: AND2       B2370. B2590
2470: AND2       B2330. B2560
2473: NOTIN      B2110
2475: AND8       B402.  B9903. B2473. B1060. B1060. B1060. B1060. B1060
2480: OR8        B2302. B2450. B2460. B2475. B2470. B2470. B2470. B2470
2490: AND2       B909.  B2550
2495: NOTIN      B2370
2500: AND2       B2310. B2495
2505: NOTIN      B2350
2510: AND2       B2300. B2505
2515: NOTIN      B2330
2520: AND2       B2290. B2515
```

```
2530: OR8       B2140, B2120, B1200, B2490, B2500, B2510, B2520, B2520
2532: NOTIN     B2530
2533: AND8      B3940, B2480, B2532, B2532, B2532, B2532, B2532, B2532
2534: NOTIN     B3940
2537: AND2      B2534, B2480
2539: OR2       B2533, B2537
2540: SRFLOP    B2390, B2400
2541: NOTIN     B2350
2542: AND2      B2300, B2541
2545: NOTIN     B2540
2550: SRFLOP    B2490, B2530
2555: NOTIN     B2550
2560: SRFLOP    B2290, B2330
2565: NOTIN     B2560
2570: SRFLOP    B2410, B2430
2575: NOTIN     B2570
2580: SRFLOP    B2300, B2350
2585: NOTIN     B2590
2590: SRFLOP    B2310, B2370
2595: NOTIN     B2590
2600: AND2      B905, B2530
2610: AND8      B2635, B3017, B905, B905, B905, B905, B905, B905
2620: OR8       B2600, B1010, B2905, B1090, B1090, B1090, B1090, B1090
2630: SRFLOP    B2610, B2620
2635: NOTIN     B2630
2637: AVALGEN   70.420
2638: AVALGEN   1.4700
2639: AVALGEN   0.2940
2640: LOSIGMTY  B1330, B2637, 2.0000
2645: AND9      B2640, B402, B2270, B2270, B2270, B2270, B2270, B2270
2650: TRANSF    B1118, B1117, B2630
2660: TRANSF    B2639, B2639, B2630
2680: TRANSF    B2660, B2650, B402
2690: GAINBI    B2680, -1.000, 0.0000
2700: HISIGMTY  B3120, B3140, 0.0000
2710: TRANSF    B2690, B2680, B2700
2720: TRANSF    B1112, B2710, B2645
2770: NOTIN     B420
2780: NOTIN     B421
2790: AND8      B421, B2770, B1060, B1060, B1060, B1060, B1060, B1060
2800: AND8      B420, B2780, B1060, B1060, B1060, B1060, B1060, B1060
2810: OR2       B2800, B2790
2829: TRANSF    B1115, B1114, B1020
2830: TRANSF    B2829, B1001, B2790
2839: TRANSF    B1116, B1113, B1020
2840: TRANSF    B2839, B1001, B2800
2850: TRANSF    B2860, B1001, B2810
2860: SUM4W     B2850, B2830, B2840, B2840, 1.0000, 1.0000, 1.0000, 1.0000
2870: SUM2      B2860, B3140
2874: AND8      B429, B1060, B1020, B1020, B1020, B1020, B1020, B1020
2875: TRANSF    B90, B2870, B2874
2880: HILMT     B2875, 100.00
2890: LOLMT     B2880, 0.0000
2900: DBEQUALS  B3120, B3140, 0.0000
2905: NOTIN     B2900
2910: DBDLTA    B3140, B3120, 0.0000
2920: MULTDIV   B2720, B30, B50
2930: ABSVAL    B2910
2940: ABSVAL    B2920
2950: LOSEL4    B2930, B2940, B2940, B2940
2960: GAINBI    B2950, -1.000, 0.0000
2980: TRANSF    B2960, B2950, B2700
2990: SUM2      B2980, B3120
```

```
2995: SUM2       B3120, B2920
2997: LOLMT      B2995,10.000
3000: AND8       B2645, B1060, B402, B402, B402, B402, B402, B402
3002: OR8        B2645, B423, B2290, B407, B2905, B2810, B2810, B2810
3007: SRFLOP     B203, B3002
3012: OR8        B2645, B904, B2900, B2810, B2810, B2810, B2810, B2810
3013: OR8        B3007, B407, B2905, B2905, B2905, B2905, B2905, B2905
3017: SRFLOP     B3012, B3013
3020: AND8       B3007, B1060, B2900, B2900, B2900, B2900, B2900, B2900
3025: AVG4W      B114, B114, B115, B115,1.0000,1.0000,1.0000,1.0000
3030: TRANSF     B1445, B3120, B2290
3033: AND2       B2540, B9902
3035: TRANSF     B1005, B3030, B3033
3040: TRANSF     B2990, B3035, B3020
3050: SUM2       B3025, B2
3060: TRANSF     B3050, B3040, B1070
3065: TRANSF     B2997, B3060, B3000
3067: AND2       B9919, B1066
3069: OR2        B1090, B3067
3070: TRANSF     B90, B3065, B3069
3090: AND2       B1010, B1010
3095: OR2        B3090, B415
3090: TRANSF     B1001, B3070, B3095
3093: GAINBI     B3243,-1.000,0.0000
3095: SUM4W      B111, B3093, B1001, B1001,1.0000,0.1000,0.0000,0.0000
3100: TRANSF     B3095, B2000, B402
3110: AND2       B407, B401
3111: AND2       B9901, B2545
3112: OR8        B3110, B1099, B3111, B3111, B3111, B3111, B3111, B3111
3115: AND8       B2265, B9935, B402, B9900, B402, B402, B402, B402
3116: TRANSF     B3100, B3090, B3112
3117: TRANSF     B3196, B3116, B3115
3119: LOLMT      B3117,0.0000
3120: HILMT      B3119,100.00
3129: OR8        B3067, B415, B3115, B415, B415, B415, B415, B415
3130: OR8        B407, B1090, B3129, B1010, B1098, B2280, B3033, B3111
3140: TRANSF     B3120, B2890, B3130
3150: DBDLTA     B2000, B90,0.0000
3153: DBEQUALS   B2000, B90,1.2220
3154: AND2       B3153, B402
3155: SRFLOP     B3154, B429
3157: DBEQUALS   B2000, B90,0.2000
3160: AND2       B3155, B3157
3163: HISIGMTV   B90, B2000,2.0000
3165: AND2       B2090, B3163
3166: NOTIN      B3165
3167: AND2       B3160, B3166
3170: TRANSF     B3150, B1001, B3167
3190: MULTDIV    B3170, B1111, B1
3191: AND2       B2545, B2260
3193: NOTIN      B3191
3194: AVALGEN    -100.0
3195: PIDVLIM    B3190, B3194, B1001, B3193,5.0000,5.0000,0.0000,0.0000
3186: SUM2       B3185, B3120
3187: TRANSF     B3196, B3120, B3191
3190: SUM2       B3180, B3120
3210: TRANSF     B3190, B3120, B2260
3211: HISIGMTV   B3120, B1005,0.0000
3212: AND2       B2090, B3211
3213: OR2        B2545, B3246
3214: OR2        B3213, B3212
3215: TRANSF     B1005, B3210, B3214
3220: DBDLTA     B3215, B1005,2.0000
```

```
3230: MULTDIV    B3220,    B1,    B1
3243: GAINBI     B4391,1.0000,0.0000
3246: OR2        B2130, B2140
3250: PIDVLIM    B3230, B1001, B3345, B3213,0.5000,25.000,0.0000,0.0000
3260: AND8       B2540, B2555, B2565, B2595, B2595, B2595, B2595, B2595
3292: AND8       B2060, B2090, B2700, B2700, B2700, B2700, B2700, B2700
3294: OR8        B402,  B415,  B3292, B3292, B3292, B3292, B3292, B3292
3295: TRANSF     B2000, B3120, B3294
3290: DBDLTA     B3295, B2000,0.0000
3292: GAINBI     B3335,-1.000,0.0000
3294: GAINBI     B1005,-1.000,0.0000
3296: SUM2       B3292, B3345
3299: SUM2       B3294, B3120
3300: AND2       B407,  B1020
3302: MULTDIV    B3296,    B1,    B1
3304: MULTDIV    B3299,    B1,    B1
3305: TRANSF     B3302, B3304, B2540
3308: OR2        B2545, B3260
3310: MULTDIV    B111,     B1,    B1
3312: NOTIN      B3309
3316: OR2        B3212, B3309
3319: TRANSF     B1005, B3210, B3316
3320: PIDVLIM    B3290, B1001, B3310, B3300,5.0000,10.000,0.0000,0.0000
3322: DBDLTA     B3319, B1005,2.0000
3324: PIDVLIM    B3322, B1001, B3306, B3309,0.5000,25.000,0.0000,0.0000
3325: GAINBI     B3324,10.000,0.0000
3330: MULTDIV    B3320,    B1,    B1
3332: TRANSF     B3325, B1001, B3312
3333: HILMT      B3330,100.00
3334: HILMT      B3330,40.000
3335: SUM4W      B3243, B1001, B3197, B3332,0.1000,0.0000,1.0000,0.1000
3336: TRANSF     B3333, B3334, B407
3337: TRANSF     B3250, B3335, B3260
3340: TRANSF     B3337, B3336, B402
3345: TRANSF     B111,  B3340, B407
3346: AND2       B401,  B2570
3347: TRANSF     B5,    B3345, B3346
3348: OR2        B1090, B415
3349: TRANSF     B1001, B3347, B3348
3370: DBEQUALS   B3349, B111,2.0000
3390: NOTIN      B3370
3390: DBEQUALS   B4391, B1008,2.0000
3400: NOTIN      B3390
3405: OR2        B2260, B402
3410: AND8       B3390, B3400, B3405, B407, B407, B407, B407, B407
3420: NOTIN      B3430
3430: AND2       B3410, B3420
3435: AND2       B2295, B1060
3440: OR2        B3430, B3435
3450: AND2       B3410, B419
3460: LOSIGNTV   B114,  B1001,0.0000
3470: HISIGNTV   B114,  B100,0.0000
3480: LOSIGNTV   B115,  B1001,0.0000
3490: HISIGNTV   B115,  B100,0.0000
3500: LOSIGNTV   B113,  B1001,0.0000
3510: HISIGNTV   B113,  B100,0.0000
3580: AND2       B438,  B1060
3590: AND2       B1060, B437
3600: NOTIN      B3590
3610: NOTIN      B3590
3620: AND8       B3246, B3600, B3590, B402, B402, B402, B402, B402
3630: AND8       B3246, B3610, B3590, B402, B402, B402, B402, B402
3640: TRANSF     B1,    B1001, B3620
```

```
3650: TRANSF      B1111, B3640, B3630
3660: SUM2        B3650, B3692
3670: HILMT       B3660,80.000
3680: LOLMT       B3670,0.0000
3690: OR2         B1010, B407
3691: OR8         B2570, B3940, B1070, B1070, B1070, B1070, B1070, B1070
3692: TRANSF       B90, B3680, B3691
3699: TRANSF      B100, B3680, B3690
3700: GAINBI      B3699,-1.000,100.00
3710: AND8         B912, B1060,  B402,  B402,  B402,  B402,  B402,  B402
3720: OR9         B3710,  B913, B4396, B3940,  B407,  B407,  B407,  B407
3740: OR2         B2590, B2550
3750: AND8         B432,  B402, B1060, B1060, B1060, B1060, B1060, B1060
3760: AND8        B1060,  B402,  B431,  B431,  B431,  B431,  B431,  B431
3770: NOTIN       B3760
3780: NOTIN       B3750
3790: AND8        B3770, B3740, B3750, B3750, B3750, B3750, B3750, B3750
3800: AND8        B3740, B3760, B3780, B3780, B3780, B3780, B3780, B3780
3810: OR9          B913, B3800, B3790,  B407, B3940, B4396, B4396, B4396
3820: TRANSF      B1113, B1001, B3790
3830: TRANSF      B1114, B3820, B3800
3840: AND8        B2595, B2595, B2555, B1205, B2565, B2565, B2565, B2565
3850: TRANSF      B1111, B3830, B3840
3860: NOTIN       B2350
3870: AND2        B2300, B3860
3880: NOTIN       B2530
3890: AND2        B3880, B2480
3920: TRANSF      B1003, B1004, B3890
3940: TRANSF      B1524, B3920, B2560
3950: TRANSF      B1495, B3940, B2590
3960: OR9         B2590, B2560, B3890, B3910, B3890, B3890, B3890, B3890
3974: OR2         B3790, B3800
3975: TRANSF      B3990, B1001, B3974
3990: SUM2        B3950, B3975
3991: SUM2        B3990, B4000
3990: HILMT       B3991,100.00
3991: LOLMT       B3990,0.0000
3995: OR2         B3960, B3940
4000: TRANSF      B3950, B3991, B3995
4010: SRFLOP      B3710, B3910
4020: NOTIN       B4010
4030: AND2        B4020, B4395
4035: OR5          B440, B3800, B3790, B4030, B4030, B4030, B4030, B4030
4045: SRFLOP      B4035, B3720
4050: DBDLTA      B4000, B4219,0.0000
4060: ABSVAL      B4050
4070: MULTDIV       B1,   B30,   B60
4080: ABSVAL      B4070
4090: LOSEL4      B4060, B4080, B4080, B4080
4100: GAINBI      B4090,-1.000,0.0000
4105: HISISMTV    B4126, B4000,0.0000
4106: AND2        B4105, B4105
4110: TRANSF      B4100, B4090, B4106
4115: TRANSF      B4110, B1001, B4010
4116: AVALGEN     0.0000
4117: NOTIN       B4105
4118: TRANSF      B4115, B4115, B3000
4119: AND2        B4117, B4375
4120: SUM2        B4119, B4126
4121: AND2        B2110, B4105
4122: OR2         B4119, B4121
4123: TRACK       B4120, B1004, B4122,1.0000
4126: TRANSF      B4000, B4123, B2539
```

```
4130: DBDLTA    B4000, B4279,0.0000
4140: ABSVAL    B4130
4150: MULTDIV      B1,    B30,    B60
4160: ABSVAL    B4150
4170: LOSEL4    B4140, B4160, B4160, B4160
4180: GAINBI    B4170,-1.000,0.0000
4185: 4ISIGNTV  B4204, B4000,0.0000
4186: AND2      B4185, B4185
4190: TRANSF    B4180, B4170, B4186
4195: TRANSF    B4190, B1001, B4010
4196: AVALGEN   -1.000
4197: NOTIN     B4195
4198: TRANSF    B4196, B4195, B3000
4199: AND2      B4197, B4376
4200: SUM2      B4199, B4204
4201: AND2      B2110, B4195
4202: OR2       B4199, B4201
4203: TRACK     B4200, B1003, B4202,1.0000
4204: TRANSF    B4000, B4203, B2542
4219: TRANSF    B1004, B4126, B2145
4220: DBDLTA    B4219, B1004,0.0000
4230: MULTDIV   B4220,    B1,    B1
4240: PIDVLIM   B4230, B1001, B4250, B2145,0.5000,10.000,0.0000,0.0000
4250: TRANSF    B4240, B4391, B2140
4260: MULTDIV   B4250,    B1,    B1
4279: TRANSF    B1003, B4204, B2135
4280: DBDLTA    B4279, B1003,0.0000
4290: MULTDIV   B4280,    B1,    B1
4300: PIDVLIM   B4290, B1001, B4310, B2135,0.2500,11.000,0.0000,0.0000
4310: TRANSF    B4300, B4391, B2130
4320: MULTDIV   B4310,    B1,    B1
4324: AND2      B1060, B401
4325: TRANSF    B1111, B1001, B4324
4330: TRANSF    B4320, B4260, B2130
4340: SUM2      B4325, B4371
4350: LOLMT     B4340,0.0000
4351: GAINBI    B1009,1.0000,0.0000
4360: TRANSF    B4350, B4330, B3940
4365: TRANSF    B4351, B4360, B407
4370: MULTDIV   B3340,    B1,    B1
4371: TRANSF    B4370, B4365, B2570
4373: DBEQUALS  B4392, B3699,0.0000
4375: OR2       B4373, B3840
4376: NOTIN     B4375
4377: GAINBI    B4371,1.0000,0.0000
4391: GAINBI    B4371,1.0000,0.0000
4392: LOSEL4    B4391, B4391, B3699, B3699
4393: TRANSF    B4377, B4392, B2570
4394: TRANSF    B4279, B4219, B2130
4395: DBEQUALS  B4000, B4394,0.0000
4396: NOTIN     B4395
4398: TRANSF     B100, B4393, B1010
4390: GAINBI    B4000,1.0000,0.0000
4391: GAINBI    B4399,1.0000,0.0000
4395: GAINBI    B2000,0.8000,20.000
4400: GAINBI    B3599,-1.000,100.00
4410: GAINBI    B4000,0.4500,1.4700
4412: GAINBI    B4000,0.1750,0.0500
4415: TRANSF    B4410, B4412, B2130
4420: GAINBI    B2000,0.4500,-0.070
4430: GAINBI    B4391,-1.000,100.00
4440: GAINBI    B3349,1.0000,0.0000
4447: AND2      B4956, B4449
```

```
4448: AND2      B4956, B4449
4449: AND2      B4956, B4450
4450: AND2      B4956, B4460
4460: AND2      B4956, B4470
4470: AND2      B4956, B4480
4480: AND2      B4956, B4490
4490: AND2      B4956, B4500
4500: AND2      B4956, B4510
4510: AND2      B4956, B4520
4520: AND2      B4956, B4530
4530: AND2      B4956, B4540
4540: AND2      B4956, B4550
4550: AND2      B4956, B4560
4560: AND2      B4956, B4570
4570: AND2      B4956, B4580
4580: AND2      B4956, B4590
4590: AND2      B4956, B4600
4600: AND2      B4956, B4610
4610: AND2      B4956, B4620
4620: AND2      B4956, B4630
4630: AND2      B4956, B4640
4640: AND2      B4956, B4650
4650: AND2      B4956, B4660
4660: AND2      B4956, B4670
4670: AND2      B4956, B4680
4680: AND2      B4956, B4690
4690: AND2      B4956, B4700
4700: AND2      B4956, B4710
4710: AND2      B4956, B4720
4720: AND2      B4956, B4730
4730: AND2      B4956, B4740
4740: AND2      B4956, B4750
4750: AND2      B4956, B4760
4760: AND2      B4956, B4770
4770: AND2      B4956, B4780
4780: AND2      B4956, B4790
4790: AND2      B4956, B4800
4800: AND2      B4956, B4810
4810: AND2      B4956, B4820
4820: AND2      B4956, B4830
4830: AND2      B4956, B4840
4940: AND2      B4956, B4850
4850: AND2      B4956, B4860
4860: AND2      B4956, B4870
4870: AND2      B4956, B4880
4880: AND2      B4956, B4890
4890: AND2      B4956, B4900
4900: AND2      B4956, B4910
4910: AND2      B4956, B4920
4920: AND2      B4956, B4930
4930: AND2      B4956, B4940
4940: AND2      B4956, B4950
4950: AND2      B4956, B4970
4951: NOTIN     B4447
4952: NOTIN     B444
4953: AND2      B4951, B4956
4954: NOTIN     B4953
4955: AND2      B4952, B4954
4956: NOTIN     B4955
4960: TIMEDEL   B4956, 0.1000
4970: XOR2      B4956, B4960
4980: OR2       B4910, B1200
4990: OR2       B4940, B2010
```

```
5000: OR2      B4930, B1400
5010: OR2      B4920, B1320
5020: OR2      B4980, B2016
5030: OR2      B4890, B2050
5040: OR2      B4870,  B403
5050: OR2      B4960,  B404
5060: OR2      B4800, B2060
5070: OR2      B4790, B2070
5080: OR2      B4780, B2080
5090: OR2      B4770, B2090
5100: OR2      B4760, B2100
5110: OR2      B4750, B2110
5120: OR2      B4610,  B413
5130: OR2      B4600,  B412
5140: OR9      B9465, B4740, B401, B401, B401, B401, B401, B401
5150: OR2      B4730, B2265
5160: OR2      B4720, B2260
5170: OR2      B4710, B2275
5180: OR2      B4700, B2270
5190: OR2      B4690, B2280
5200: OR2      B4680, B3440
5210: OR2      B4660, B2800
5220: OR2      B4670, B2790
5230: OR2      B4650, B3007
5240: OR2      B4640, B3017
5250: OR2      B4630, B2630
5260: OR2      B4620, B2635
5270: OR2      B4590,  B408
5280: OR2      B4580, B3800
5290: OR2      B4570, B3790
5291: OR2      B2570, B4460
5292: OR2      B2540, B4449
5293: OR2      B2545, B4450
5300: OR2      B4560, B2555
5310: OR2      B4550, B2550
5320: OR2      B4540, B2565
5330: OR2      B4530, B2560
5340: OR2      B4520, B2585
5350: OR2      B4510, B2580
5360: OR2      B4500, B2595
5370: OR2      B4490, B2590
5380: OR2      B4480, B3630
5390: OR2      B4470, B3620
5400: OR2      B4448, B4010
5410: OR2      B4447, B4045
5420: OR2      B4900, B1270
5430: OR2      B4950, B4950
5450: OR2      B1526, B4850
5460: OR2      B2015, B4840
5470: OR2      B2019, B4830
5480: OR2      B3155, B4820
5490: OR2      B4810, B4810
5495: OR2      B4970, B4970
5496: OR2      B4956, B4447
5498: GAINBI   B3140, 0.9600, 0.0000
5499: GAINBI   B3140, 0.7000, 0.0000
5500: GAINBI   B3140, 45.000, 0.0000
5501: TRANSF   B5499, B5499, B2540
5502: TRANSF   B5501, B5500,  B402
5503: LOLMT    B5502, 0.0000
5510: DVALGEN  0
5520: DVALGEN  1
5528: GAINBI   B3120, 0.9600, 0.0000
```

```
5529: GAINBI     B3120,0.7000,0.0000
5530: GAINBI     B3120,45.000,0.0000
5531: TRANSF    B5529, B5529, B2540
5532: TRANSF    B5531, B5530,  B402
5533: LOLMT     B5532,0.0000
5556: AVALGEN   -25.00
9461: NOTIN      B401
9463: NOTIN     B9465
9465: AND2      B9461, B9463
8900: OR2        B402,  B402
8901: OR2       B2540, B2540
8902: NOTIN     B8901
8903: OR2        B407,  B407
8904: NOTIN     B8903
8905: NOTIN     B8900
8910: OR2        B401,  B401
8915: NOTIN     B8910
8916: MULTDIV   B121,    B1,    B1
8917: MULTDIV   B122,    B1,    B1
8918: MULTDIV   B123,    B1,    B1
8919: OR2       B415,  B415
8920: OR2       B416,  B416
8921: OR2       B417,  B417
8922: OR2       B418,  B418
8923: OR2       B422,  B422
8924: OR2       B423,  B423
8925: OR2       B424,  B424
8926: OR2       B427,  B427
8927: OR2       B443,  B443
8928: OR2       B433,  B433
8929: OR2       B434,  B434
8930: OR2       B435,  B435
8931: OR2       B436,  B436
8932: OR2       B439,  B439
8933: OR2       B440,  B440
8935: OR2       B2260, B2260
8940: NOTIN     B8920
8941: NOTIN     B8921
8942: NOTIN     B8922
8943: NOTIN     B8923
8944: NOTIN     B8924
8945: NOTIN     B8925
8946: NOTIN     B8926
8947: NOTIN     B8927
8948: NOTIN     B8928
8949: NOTIN     B8929
8950: NOTIN     B8930
8951: NOTIN     B8931
8952: NOTIN     B8932
8953: NOTIN     B8933
8960: AND2      B1020, B2265
8961: AND2      B1010, B1020
8962: OR2       B8961, B8960
9002: AVALGEN   3.0000
9301: ANOUT     B4390, A301,   22
9302: ANOUT     B4395, A302,   21
9305: ANOUT     B4400, A305,   22
9306: ANOUT     B4415, A306,   22
9307: ANOUT     B4420, A307,   24
9313: ANOUT     B4430, A313,   22
9314: ANOUT     B4440, A314,   22
9401: DGOUT     B5420, D301
9402: DGOUT     B4990, D302
```

```
9403: DGOUT      B5430,    D303
9404: DGOUT      B4990,    D304
9405: DGOUT      B5000,    D305
9406: DGOUT      B5010,    D306
9407: DGOUT      B5020,    D307
9408: DGOUT      B5030,    D308
9409: DGOUT      B5040,    D309
9410: DGOUT      B5050,    D310
9411: DGOUT      B5450,    D311
9412: DGOUT      B5460,    D312
9413: DGOUT      B5470,    D313
9414: DGOUT      B5480,    D314
9415: DGOUT      B5490,    D315
9416: DGOUT       B401,    D316
9417: DGOUT      B5060,    D317
9418: DGOUT      B5070,    D318
9419: DGOUT      B5080,    D319
9420: DGOUT      B5090,    D320
9421: DGOUT      B5100,    D321
9422: DGOUT      B5110,    D322
9423: DGOUT      B5120,    D323
9424: DGOUT      B5130,    D324
9425: DGOUT      B9962,    D325
9426: DGOUT      B3450,    D326
9427: DGOUT      B5495,    D327
9428: DGOUT       B409,    D328
9429: DGOUT      B2016,    D329
9448: IBCDOUT    B5533,    D333
9449: DGOUT      B5520,    D356
9450: DGOUT      B5510,    D356
9451: MULTDIV      B1,       B1,     B1
9452: MULTDIV      B1,       B1,     B1
9453: MULTDIV      B1,       B1,     B1
9461: IBCDOUT    B5503,    D333
9462: DGOUT      B5520,    D350
9463: DGOUT      B5510,    D350
9465: DGOUT      B5140,    D365
9466: DGOUT      B5150,    D366
9467: DGOUT      B5160,    D367
9468: DGOUT      B5170,    D368
9469: DGOUT      B5180,    D369
9470: DGOUT      B5190,    D370
9471: DGOUT      B5200,    D371
9472: DGOUT      B5210,    D372
9473: DGOUT      B5220,    D373
9474: DGOUT      B5230,    D374
9475: DGOUT      B5240,    D375
9476: DGOUT      B5250,    D376
9477: DGOUT      B5260,    D377
9478: DGOUT      B5270,    D378
9479: DGOUT      B5291,    D379
9480: DGOUT      B5496,    D380
9481: DGOUT      B5280,    D381
9482: DGOUT      B5290,    D382
9483: DGOUT      B5300,    D383
9484: DGOUT      B5310,    D384
9485: DGOUT      B5320,    D385
9486: DGOUT      B5330,    D386
9487: DGOUT      B5340,    D387
9488: DGOUT      B5350,    D388
9489: DGOUT      B5360,    D389
9490: DGOUT      B5370,    D390
9491: DGOUT      B5380,    D391
```

```
9492: DGOUT    B5390.   D392
9493: DGOUT    B5400.   D393
9494: DGOUT    B5410.   D394
9495: DGOUT    B5293.   D395
9496: DGOUT    B5292.   D396
9497: DGOUT    B2003.   D397
9498: DGOUT    B2010.   D398
9499: DGOUT    B1400.   D399
9500: DGOUT    B1320.   D400
9501: DGOUT    B1200.   D401
9502: DGOUT    B1270.   D402
9503: DGOUT    B2050.   D403
9504: DGOUT    B403.    D404
9513: DGOUT    B404.    D413
9514: DGOUT    B2280.   D414
9515: DGOUT    B2565.   D415
9516: DGOUT    B2595.   D416
9517: DGOUT    B2275.   D417
9518: DGOUT    B426.    D418
9519: DGOUT    B4375.   D419
9520: DGOUT    B425.    D420
9529: DGOUT    B3460.   D429
9530: DGOUT    B3470.   D430
9531: DGOUT    B3480.   D431
9532: DGOUT    B3490.   D432
9533: DGOUT    B3500.   D433
9534: DGOUT    B3510.   D434
9535: DGOUT    B2015.   D435
9536: DGOUT    B5520.   D436
9999: DISPLAYA B1526.1.0000.0.0000
9999: DISPLAYB B4430.1.0000.0.0000
ENTER: LOAD.GO.TUNE.LIST.TAPE.MSG
```

APPENDIX C

MTCS-20[tm] ADDRESS LABEL CONVERSION TABLE

DIGITAL INPUT LABEL TO DIOB ADDRESS CONVERSION:

| LABEL | DIOB ADDRESS | BIT POSITION | LABEL | DIOB ADDRESS | BIT POSITION |
|---|---|---|---|---|---|
| D1  | xx1E6H | 0  | D40 | xx1DEH | 9  |
| D2  | xx1E6H | 1  | D41 | xx1DEH | 10 |
| D3  | xx1E6H | 2  | D42 | xx1DEH | 11 |
| D4  | xx1E6H | 3  | D43 | xx1DEH | 12 |
| D5  | xx1E6H | 4  | D44 | xx1DEH | 13 |
| D6  | xx1E6H | 5  | D45 | xx1DEH | 14 |
| D7  | xx1E6H | 6  | D46 | xx1DAH | 0  |
| D8  | xx1E6H | 7  | D47 | xx1DAH | 1  |
| D9  | xx1E6H | 8  | D48 | xx1DAH | 2  |
| D10 | xx1E6H | 9  | D49 | xx1DAH | 3  |
| D11 | xx1E6H | 10 | D50 | xx1DAH | 4  |
| D12 | xx1E6H | 11 | D51 | xx1DAH | 5  |
| D13 | xx1E6H | 12 | D52 | xx1DAH | 6  |
| D14 | xx1E6H | 13 | D53 | xx1DAH | 7  |
| D15 | xx1E2H | 14 | D54 | xx1DAH | 8  |
| D16 | xx1E2H | 0  | D55 | xx1DAH | 9  |
| D17 | xx1E2H | 1  | D56 | xx1DAH | 10 |
| D18 | xx1E2H | 2  | D57 | xx1DAH | 11 |

| | | |
|---|---|---|
| D19 | xx1E2H | 3 |
| D20 | xx1E2H | 4 |
| D21 | xx1E2H | 5 |
| D22 | xx1E2H | 6 |
| D23 | xx1E2H | 7 |
| D24 | xx1E2H | 8 |
| D25 | xx1E2H | 9 |
| D26 | xx1E2H | 10 |
| D27 | xx1E2H | 11 |
| D28 | xx1E2H | 12 |
| D29 | xx1E2H | 13 |
| D30 | xx1E2H | 14 |
| D31 | xx1E2H | 0 |
| D32 | xx1E2H | 1 |
| D33 | xx1E2H | 2 |
| D34 | xx1E2H | 3 |
| D35 | xx1E2H | 4 |
| D36 | xx1E2H | 5 |
| D37 | xx1E2H | 6 |
| D38 | xx1DEH | 7 |
| D39 | xx1DEH | 8 |
| D58 | xx1DAH | 12 |
| D59 | xx1DAH | 13 |
| D60 | xx1DAH | 14 |
| D61 | xx1D6H | 0 |
| D62 | xx1D6H | 1 |
| D63 | xx1D6H | 2 |
| D64 | xx1D6H | 3 |
| D65 | xx1D6H | 4 |
| D66 | xx1D6H | 5 |
| D67 | xx1D6H | 6 |
| D68 | xx1D6H | 7 |
| D69 | xx1D6H | 8 |
| D70 | xx1D6H | 9 |
| D71 | xx1D6H | 10 |
| D72 | xx1D6H | 11 |
| D73 | xx1D6H | 12 |
| D74 | xx1D6H | 13 |
| D75 | xx1D6H | 14 |
| D76 | xx1D2H | 0 |
| D77 | xx1D2H | 1 |
| D78 | xx1D2H | 2 |
| D79 | xx1D2H | 3 |
| D80 | xx1D2H | 4 |
| D81 | xx1D2H | 5 |
| D82 | xx1D2H | 6 |
| D83 | xx1D2H | 7 |
| D84 | xx1D2H | 8 |
| D85 | xx1D2H | 9 |
| D86 | xx1D2H | 10 |
| D87 | xx1D2H | 11 |
| D88 | xx1D2H | 12 |
| D89 | xx1D2H | 13 |
| D90 | xx1D2H | 14 |
| D91 | xx16AH | 0 |
| D92 | xx16AH | 1 |
| D93 | xx16AH | 2 |
| D94 | xx16AH | 3 |
| D95 | xx16AH | 4 |
| D96 | xx16AH | 5 |
| D97 | xx16AH | 6 |
| D98 | xx16AH | 7 |
| D99 | xx16AH | 8 |
| D100 | xx16AH | 9 |
| D101 | xx16AH | 10 |
| D102 | xx16AH | 11 |
| D103 | xx16AH | 12 |
| D104 | xx16AH | 13 |
| D105 | xx16AH | 14 |
| D106 | xx15AH | 0 |
| D107 | xx15AH | 1 |
| D108 | xx15AH | 2 |
| D109 | xx15AH | 3 |
| D110 | xx15AH | 4 |
| D111 | xx15AH | 5 |
| D112 | xx15AH | 6 |
| D113 | xx15AH | 7 |
| D114 | xx15AH | 8 |
| D115 | xx15AH | 9 |
| D116 | xx15AH | 10 |
| D117 | xx15AH | 11 |
| D118 | xx15AH | 12 |
| D119 | xx15AH | 13 |
| D120 | xx15AH | 14 |
| D121 | xx14AH | 0 |
| D123 | xx14AH | 2 |
| D124 | xx14AH | 3 |
| D125 | xx14AH | 4 |
| D126 | xx14AH | 5 |
| D127 | xx14AH | 6 |
| D128 | xx14AH | 7 |
| D129 | xx14AH | 8 |
| D130 | xx14AH | 9 |
| D131 | xx14AH | 10 |
| D132 | xx14AH | 11 |
| D133 | xx14AH | 12 |
| D134 | xx14AH | 13 |
| D135 | xx14AH | 14 |
| D136 | xx13AH | 0 |
| D137 | xx13AH | 1 |
| D138 | xx13AH | 2 |
| D139 | xx13AH | 3 |
| D140 | xx13AH | 4 |
| D141 | xx13AH | 5 |
| D142 | xx13AH | 6 |
| D143 | xx13AH | 7 |
| D144 | xx13AH | 8 |
| D145 | xx13AH | 9 |
| D146 | xx13AH | 10 |
| D147 | xx13AH | 11 |
| D148 | xx13AH | 12 |
| D149 | xx13AH | 13 |
| D150 | xx13AH | 14 |
| D151 | xx12AH | 0 |
| D152 | xx12AH | 1 |
| D153 | xx12AH | 2 |
| D154 | xx12AH | 3 |
| D155 | xx12AH | 4 |
| D156 | xx12AH | 5 |
| D157 | xx12AH | 6 |
| D158 | xx12AH | 7 |
| D159 | xx12AH | 8 |
| D160 | xx12AH | 9 |
| D161 | xx12AH | 10 |
| D162 | xx12AH | 11 |
| D163 | xx12AH | 12 |
| D164 | xx12AH | 13 |
| D165 | xx12AH | 14 |

| | | | | | |
|---|---|---|---|---|---|
| D122 | xx14AH | 1 | D166 | xx11AH | 0 |
| D167 | xx11AH | 1 | D196 | xx106H | 0 |
| D168 | xx11AH | 2 | D197 | xx106H | 1 |
| D169 | xx11AH | 3 | D198 | xx106H | 2 |
| D170 | xx11AH | 4 | D199 | xx106H | 3 |
| D171 | xx11AH | 5 | D200 | xx106H | 4 |
| D172 | xx11AH | 6 | D201 | xx106H | 5 |
| D173 | xx11AH | 7 | D202 | xx106H | 6 |
| D174 | xx11AH | 8 | D203 | xx106H | 7 |
| D175 | xx11AH | 9 | D204 | xx106H | 8 |
| D176 | xx11AH | 10 | D205 | xx106H | 9 |
| D177 | xx11AH | 11 | D206 | xx106H | 10 |
| D178 | xx11AH | 12 | D207 | xx106H | 11 |
| D179 | xx11AH | 13 | D208 | xx106H | 12 |
| D180 | xx11AH | 14 | D209 | xx106H | 13 |
| D181 | xx10AH | 0 | D210 | xx106H | 14 |
| D182 | xx10AH | 1 | D211 | xx102H | 0 |
| D183 | xx10AH | 2 | D212 | xx102H | 1 |
| D184 | xx10AH | 3 | D213 | xx102H | 2 |
| D185 | xx10AH | 4 | D214 | xx102H | 3 |
| D186 | xx10AH | 5 | D215 | xx102H | 4 |
| D187 | xx10AH | 6 | D216 | xx102H | 5 |
| D188 | xx10AH | 7 | D217 | xx102H | 6 |
| D189 | xx10AH | 8 | D218 | xx102H | 7 |
| D190 | xx10AH | 9 | D219 | xx102H | 8 |
| D191 | xx10AH | 10 | D220 | xx102H | 9 |
| D192 | xx10AH | 11 | D221 | xx102H | 10 |
| D193 | xx10AH | 12 | D222 | xx102H | 11 |
| D194 | xx10AH | 13 | D223 | xx102H | 12 |
| D195 | xx10AH | 14 | D224 | xxx12H | 13 |
| | | | D225 | xx102H | 14 |
| D301 | xx1E8H | 0 | D345 | xx1E0H | 12 |
| D302 | xx1E8H | 1 | D346 | xx1E0H | 13 |
| D303 | xx1E8H | 2 | D347 | xx1E0H | 14 |
| D304 | xx1E8H | 3 | D348 | xx1E0H | 15 |
| D305 | xx1E8H | 4 | D349 | xx1DCH | 0 |
| D306 | xx1E8H | 5 | D350 | xx1DCH | 1 |
| D307 | xx1E8H | 6 | D351 | xx1DCH | 2 |
| D308 | xx1E8H | 7 | D352 | xx1DCH | 3 |
| D309 | xx1E8H | 8 | D353 | xx1DCH | 4 |
| D310 | xx1E8H | 9 | D354 | xx1DCH | 5 |
| D311 | xx1E8H | 10 | D355 | xx1DCH | 6 |
| D312 | xx1E8H | 11 | D356 | xx1DCH | 7 |
| D313 | xx1E8H | 12 | D357 | xx1DCH | 8 |
| D314 | xx1E8H | 13 | D358 | xx1DCH | 9 |
| D315 | xx1E8H | 14 | D359 | xx1DCH | 10 |
| D316 | xx1E8H | 15 | D360 | xx1DCH | 11 |
| D317 | xx1E4H | 0 | D361 | xx1DCH | 12 |
| D318 | xx1E4H | 1 | D362 | xx1DCH | 13 |
| D319 | xx1E4H | 2 | D363 | xx1DCH | 14 |
| D320 | xx1E4H | 3 | D364 | xx1DCH | 15 |
| D321 | xx1E4H | 4 | D365 | xx1D8H | 0 |
| D322 | xx1E4H | 5 | D366 | xx1D8H | 1 |
| D323 | xx1E4H | 6 | D367 | xx1D8H | 2 |
| D324 | xx1E4H | 7 | D368 | xx1D8H | 3 |
| D325 | xx1E4H | 8 | D369 | xx1D8H | 4 |
| D326 | xx1E4H | 9 | D370 | xx1D8H | 5 |
| D327 | xx1E4H | 10 | D371 | xx1D8H | 6 |
| D328 | xx1E4H | 11 | D372 | xx1D8H | 7 |
| D329 | xx1E4H | 12 | D373 | xx1D8H | 8 |
| D330 | xx1E4H | 13 | D374 | xx1D8H | 9 |
| D331 | xx1E4H | 14 | D375 | xx1D8H | 10 |
| D332 | xx1E4H | 15 | D376 | xx1D8H | 11 |
| D333 | xx1E0H | 0 | D377 | xx1D8H | 12 |

| | | | | | |
|---|---|---|---|---|---|
| D334 | xx1E0H | 1 | D378 | xx1D8H | 13 |
| D335 | xx1E0H | 2 | D379 | xx1D8H | 14 |
| D336 | xx1E0H | 3 | D380 | xx1D8H | 15 |
| D337 | xx1E0H | 4 | D381 | xx1D4H | 0 |
| D338 | xx1E0H | 5 | D382 | xx1D4H | 1 |
| D339 | xx1E0H | 6 | D383 | xx1D4H | 2 |
| D340 | xx1E0H | 7 | D384 | xx1D4H | 3 |
| D341 | xx1E0H | 8 | D385 | xx1D4H | 4 |
| D342 | xx1E0H | 9 | D386 | xx1D4H | 5 |
| D343 | xx1E0H | 10 | D387 | xx1D4H | 6 |
| D344 | xx1E0H | 11 | D388 | xx1D4H | 7 |
| D389 | xx1D4H | 8 | D433 | xx158H | 4 |
| D390 | xx1D4H | 9 | D434 | xx158H | 5 |
| D391 | xx1D4H | 10 | D435 | xx158H | 6 |
| D392 | xx1D4H | 11 | D436 | xx158H | 7 |
| D393 | xx1D4H | 12 | D437 | xx158H | 8 |
| D394 | xx1D4H | 13 | D438 | xx158H | 9 |
| D395 | xx1D4H | 14 | D439 | xx158H | 10 |
| D396 | xx1D4H | 15 | D440 | xx158H | 11 |
| D397 | xx1D0H | 0 | D441 | xx158H | 12 |
| D398 | xx1D0H | 1 | D442 | xx158H | 13 |
| D399 | xx1D0H | 2 | D443 | xx158H | 14 |
| D400 | xx1D0H | 3 | D444 | xx158H | 15 |
| D401 | xx1D0H | 4 | D445 | xx148H | 0 |
| D402 | xx1D0H | 5 | D446 | xx148H | 1 |
| D403 | xx1D0H | 6 | D447 | xx148H | 2 |
| D404 | xx1D0H | 7 | D448 | xx148H | 3 |
| D405 | xx1D0H | 8 | D449 | xx148H | 4 |
| D406 | xx1D0H | 9 | D450 | xx148H | 5 |
| D407 | xx1D0H | 10 | D451 | xx148H | 6 |
| D408 | xx1D0H | 11 | D452 | xx148H | 7 |
| D409 | xx1D0H | 12 | D453 | xx148H | 8 |
| D410 | xx1D0H | 13 | D454 | xx148H | 9 |
| D411 | xx1D0H | 14 | D455 | xx148H | 10 |
| D412 | xx1D0H | 15 | D456 | xx148H | 11 |
| D413 | xx168H | 0 | D457 | xx148H | 12 |
| D414 | xx168H | 1 | D458 | xx148H | 13 |
| D415 | xx168H | 2 | D459 | xx148H | 14 |
| D416 | xx168H | 3 | D460 | xx148H | 15 |
| D417 | xx168H | 4 | D461 | xx138H | 0 |
| D418 | xx168H | 5 | D462 | xx138H | 1 |
| D419 | xx168H | 6 | D463 | xx138H | 2 |
| D420 | xx168H | 7 | D464 | xx138H | 3 |
| D421 | xx168H | 8 | D465 | xx138H | 4 |
| D422 | xx168H | 9 | D466 | xx138H | 5 |
| D423 | xx168H | 10 | D467 | xx138H | 6 |
| D424 | xx168H | 11 | D468 | xx138H | 7 |
| D425 | xx168H | 12 | D469 | xx138H | 8 |
| D426 | xx168H | 13 | D470 | xx138H | 9 |
| D427 | xx168H | 14 | D471 | xx138H | 10 |
| D428 | xx168H | 15 | D472 | xx138H | 11 |
| D429 | xx158H | 0 | D473 | xx138H | 12 |
| D430 | xx158H | 1 | D474 | xx138H | 13 |
| D431 | xx158H | 2 | D475 | xx138H | 14 |
| D432 | xx158H | 3 | D476 | xx138H | 15 |
| D477 | xx128H | 0 | D509 | xx108H | 0 |
| D478 | xx128H | 1 | D510 | xx108H | 1 |
| D479 | xx128H | 2 | D511 | xx108H | 2 |
| D480 | xx128H | 3 | D512 | xx108H | 3 |
| D481 | xx128H | 4 | D513 | xx108H | 4 |
| D482 | xx128H | 5 | D514 | xx108H | 5 |
| D483 | xx128H | 6 | D515 | xx108H | 6 |
| D484 | xx128H | 7 | D516 | xx108H | 7 |
| D485 | xx128H | 8 | D517 | xx108H | 8 |

| | | | | | | |
|---|---|---|---|---|---|---|
| D486 | xx128H | 9 | | D518 | xx108H | 9 |
| D487 | xx128H | 10 | | D519 | xx108H | 10 |
| D488 | xx128H | 11 | | D520 | xx108H | 11 |
| D489 | xx128H | 12 | | D521 | xx108H | 12 |
| D490 | xx128H | 13 | | D522 | xx108H | 13 |
| D491 | xx128H | 14 | | D523 | xx108H | 14 |
| D492 | xx128H | 15 | | D524 | xx108H | 15 |
| D493 | xx118H | 0 | | D525 | xx104H | 0 |
| D494 | xx118H | 1 | | D526 | xx104H | 1 |
| D495 | xx118H | 2 | | D527 | xx104H | 2 |
| D496 | xx118H | 3 | | D528 | xx104H | 3 |
| D497 | xx118H | 4 | | D529 | xx104H | 4 |
| D498 | xx118H | 5 | | D530 | xx104H | 5 |
| D499 | xx118H | 6 | | D531 | xx104H | 6 |
| D500 | xx118H | 7 | | D532 | xx104H | 7 |
| D501 | xx118H | 8 | | D533 | xx104H | 8 |
| D502 | xx118H | 9 | | D534 | xx104H | 9 |
| D503 | xx118H | 10 | | D535 | xx104H | 10 |
| D504 | xx118H | 11 | | D536 | xx104H | 11 |
| D505 | xx118H | 12 | | D537 | xx104H | 12 |
| D506 | xx118H | 13 | | D538 | xx104H | 13 |
| D507 | xx118H | 14 | | D539 | xx104H | 14 |
| D508 | xx118H | 15 | | D540 | xx104H | 15 |

ANALOG INPUT LABEL TO DIOB ADDRESS CONVERSION:

| LABEL | DIOB ADDRESS | LABEL | DIOB ADDRESS |
|---|---|---|---|
| A1 | xx010 | A44 | xx082 |
| A2 | xx012 | A45 | xx084 |
| A3 | xx014 | A46 | xx086 |
| A4 | xx016 | A47 | xx088 |
| A5 | xx018 | A48 | xx08A |
| A6 | xx01A | A49 | xx090 |
| A7 | xx020 | A50 | xx092 |
| A8 | xx022 | A51 | xx094 |
| A9 | xx024 | A52 | xx096 |
| A10 | xx026 | A53 | xx098 |
| A11 | xx028 | A54 | xx09A |
| A12 | xx02A | A55 | xx0A0 |
| A13 | xx030 | A56 | xx0A2 |
| A14 | xx032 | A57 | xx0A4 |
| A15 | xx034 | A58 | xx0A6 |
| A16 | xx036 | A59 | xx0A8 |
| A17 | xx038 | A60 | xx0AA |
| A18 | xx03A | A61 | xx0B0 |
| A19 | xx040 | A62 | xx0B2 |
| A20 | xx042 | A63 | xx0B4 |
| A21 | xx044 | A64 | xx0B6 |
| A22 | xx046 | A65 | xx0B8 |
| A23 | xx048 | A66 | xx0BA |
| A24 | xx04A | A67 | xx0C0 |
| A25 | xx050 | A68 | xx0C2 |
| A26 | xx052 | A69 | xx0C4 |
| A27 | xx054 | A70 | xx0C6 |
| A28 | xx056 | A71 | xx0C8 |
| A28 | xx058 | A72 | xx0CA |
| A29 | xx05A | A73 | xx0D0 |
| A30 | xx060 | A74 | xx0D2 |
| A31 | xx062 | A75 | xx0D4 |
| A32 | xx064 | A76 | xx0D6 |
| A33 | xx066 | A77 | xx0D8 |

| LABEL | DIOB ADDRESS | LABEL | DIOB ADDRESS |
|---|---|---|---|
| A34 | xx068 | A78 | xx0DA |
| A35 | xx06A | A79 | xx0E0 |
| A36 | xx070 | A80 | xx0E2 |
| A37 | xx072 | A81 | xx0E4 |
| A38 | xx074 | A82 | xx0E6 |
| A39 | xx076 | A83 | xx0E8 |
| A40 | xx078 | A84 | xx0EA |
| A41 | xx07A | A85 | xx0F0 |
| A42 | xx080 | A86 | xx0F2 |
| A43 | xx082 | A87 | xx0F4 |
| A88 | xx0F6 | A119 | xx148 |
| A89 | xx0F8 | A120 | xx14A |
| A90 | xx0FA | A121 | xx150 |
| A91 | xx100 | A122 | xx152 |
| A92 | xx102 | A123 | xx154 |
| A93 | xx104 | A124 | xx156 |
| A94 | xx106 | A125 | xx158 |
| A95 | xx108 | A126 | xx15A |
| A96 | xx10A | A127 | xx160 |
| A97 | xx110 | A128 | xx162 |
| A98 | xx112 | A129 | xx164 |
| A99 | xx114 | A130 | xx166 |
| A100 | xx116 | A131 | xx168 |
| A101 | xx118 | A132 | xx16A |
| A102 | xx11A | A133 | xx170 |
| A103 | xx120 | A134 | xx172 |
| A140 | xx122 | A135 | xx174 |
| A105 | xx124 | A136 | xx176 |
| A106 | xx126 | A137 | xx178 |
| A107 | xx128 | A138 | xx17A |
| A108 | xx12A | A139 | xx180 |
| A109 | xx130 | A140 | xx182 |
| A110 | xx132 | A141 | xx184 |
| A111 | xx134 | A142 | xx186 |
| A112 | xx136 | A143 | xx188 |
| A113 | xx138 | A144 | xx18A |
| A114 | xx13A | A145 | xx190 |
| A115 | xx140 | A146 | xx192 |
| A116 | xx142 | A147 | xx194 |
| A117 | xx144 | A148 | xx196 |
| A118 | xx146 | A149 | xx198 |
|  |  | A150 | xx19A |

AUTO/MANUAL STATION LABEL TO DIOB ADDRESS CONVERSION:

| LABEL | DIOB ADDRESS | LABEL | DIOB ADDRESS |
|---|---|---|---|
| A201 | xx01C | A213 | xx0DC |
| A202 | xx02C | A214 | xx0EC |
| A203 | xx03C | A215 | xx0FC |
| A204 | xx04C | A216 | XX10C |
| A205 | xx05C | A217 | XX11C |
| A206 | xx06C | A218 | XX12C |
| A207 | xx07C | A219 | XX13C |
| A208 | xx08C | A220 | XX14C |
| A209 | xx09C | A221 | XX15C |
| A210 | xx0AC | A222 | XX16C |
| A211 | xx0BC | A223 | XX17C |
| A212 | xx0CC | A224 | XX18C |
|  |  | A225 | XX19C |

ANALOG OUTPUT LABEL TO DIOB ADDRESS CONVERSION:

| LABEL | DIOB ADDRESS | LABEL | DIOB ADDRESS |
|---|---|---|---|
| A301 | xx1C8 | A341 | xx178 |
| A302 | xx1CA | A342 | xx17A |
| A303 | xx1CC | A343 | xx17C |
| A304 | xx1CE | A344 | xx17E |
| A305 | xx1C0 | A345 | xx170 |
| A306 | xx1C2 | A346 | xx172 |
| A307 | xx1C4 | A347 | xx174 |
| A308 | xx1C6 | A348 | xx176 |
| A309 | xx1B8 | A349 | xx160 |
| A310 | xx1BA | A350 | xx162 |
| A311 | xx1BC | A351 | xx164 |
| A312 | xx1BE | A352 | xx156 |
| A313 | xx1B0 | A353 | xx150 |
| A314 | xx1B2 | A354 | xx152 |
| A315 | xx1B4 | A355 | xx154 |
| A316 | xx1B6 | A356 | xx156 |
| A317 | xx1A8 | A357 | xx140 |
| A318 | xx1AA | A358 | xx142 |
| A319 | xx1AC | A359 | xx144 |
| A320 | xx1AE | A360 | xx146 |
| A321 | xx1A0 | A361 | xx130 |
| A322 | xx1A2 | A362 | xx132 |
| A323 | xx1A4 | A363 | xx134 |
| A324 | xx1A6 | A364 | xx136 |
| A325 | xx198 | A365 | xx120 |
| A326 | xx19A | A366 | xx122 |
| A327 | xx19C | A367 | xx124 |
| A328 | xx19E | A368 | xx126 |
| A329 | xx190 | A369 | xx110 |
| A330 | xx192 | A370 | xx112 |
| A331 | xx194 | A371 | xx114 |
| A332 | xx196 | A372 | xx116 |
| A333 | xx188 | A373 | xx1F0 |
| A334 | xx18A | A374 | xx1F2 |
| A335 | xx18C | A375 | xx1F4 |
| A336 | xx18E | A376 | xx1F6 |
| A337 | xx180 | A377 | xx1E0 |
| A338 | xx182 | A378 | xx1E2 |
| A339 | xx184 | A379 | xx1E4 |
| A340 | xx186 | A380 | xx1E6 |

APPENDIX D

Q-LINE CARD TYPE SPECIFICATIONS

The card type as required by the AIN, ANOUT, and TCIN algorithms are:

| Card Type | Range | Units | Card Names And Group Numbers |
|---|---|---|---|
| 1 | -20 to +20 | mV | QAI (go1), QAV (go1) |
| 2 | -50 to +50 | mV | QAI (go2), QAV (go2) |
| 3 | -100 to +100 | mV | QAI (go3) |
| 4 | -500 to +500 | mV | QAI (go4) |
| 5 | -1 to +1 | V | QAI (go5) |
| 6 | -10 to +10 | V | QAI (go6) |

| | | |
|---|---|---|
| 7 | 0 to +20 | mA |
| 8 | -50 to +50 | mA |
| 9 | +4 to +20 | mA |
| 11 | 0 to +10 | mV |
| 12 | 0 to +33 1/3 | mV |
| 13 | 0 to +1 | V |
| 14 | 0 to +5 | V |
| 15 | 0 to +10 | V |
| 16 | 0 to +20 | mA |
| 17 | -10 to +10 | V |
| 18 | -5 to +5 | V |
| 19 | 0 to +10 | V |
| 20 | 1 to +5 | V |
| 21 | 0 to +20 | mA |
| 22 | 0 to +10 | V |
| 23 | -10 to +10 | V |
| 24 | 0 to +5 | V |
| 25 | -5 to +5 | V |
| 26 | -10 to +10 | V |
| 27 | 0 to +20 | mA |
| 28 | -10 to +10 | V |
| 29 | +4 to +20 | mA |

QAI (go7)
QAI (go8)
QAI (go7) (software limited)
QRT (go1)
QRT (go2)
QAW (go1)
QAW (go2)
QAW (go3)
QAW (go4)
QAH (go1)
QAH (go2)
QAH (go3)
QAH (go4)
QAO (go1)
QAO (go2)
QAO (go3)
QAO (go4)
QAO (go5)
QAO (go6)
QAO (go7)
QAO (go8)
QAO (go9) (software limited)

We claim:

1. A control apparatus for operating an extraction steam turbine-electric power generation system in accordance with an electric load demand and for correcting the speed of said turbine so as to maintain synchronous speed during a disturbance in the existing electric load, said apparatus comprising:

at least one turbine inlet steam control valve;

a valve controller means for positioning said control valve;

a means for generating a demand reference signal varying in accordance with said electric load demand;

a transducer means for generating a speed feedback signal varying in accordance with said turbine speed;

a transducer means for generating a megawatt feedback signal varying in accordance with said electric load;

a comparator means for producing a speed error signal equal to the difference between the level of a fixed speed reference signal and the level of said speed feedback signal;

a monitor means for monitoring said speed feedback signal level and for generating a detection signal in a first mode corresponding to said speed feedback signal level within a speed deadband and in a second mode corresponding to said speed feedback signal level beyond said speed deadband;

a first selector means responsive to said detection signal for determining a correction signal with a value equal to the value of said speed error signal in said first mode and with a value equal to a null signal in said second mode;

a means for generating a first control signal varying in accordance with a first predetermined function of said correction signal and said demand reference signal;

a second selector means for determining a second control signal with a first value equal to said first control signal in response to a first operator selection or with a second value equal to said demand reference signal in response to either a second operator selection or an operating condition of said system; and a controller means for generating a setpoint signal in accordance with a second predetermined function of said megawatt feedback signal and said second control signal, said valve controller means being responsive to said setpoint signal.

2. A control apparatus as in claim 1 wherein said speed deadband is formed by a preset upper limit and a preset lower limit, said preset limits respectively above and below said fixed speed reference signal level.

3. A control apparatus as in claim 2 wherein said detection signal is initially latched in said first mode and, after becoming latched in said second mode in response to an operation of said monitor means, can be restored to said first mode by a third operator selection.

4. A control apparatus as in claim 3 wherein said first predetermined function is additive.

5. A control apparatus as in claim 4 wherein said first and said second operator selections are mutually exclusive and are made in a singular manner, each repeated operator selection respectively causing said second selector means alternately to determine said second control signal value equal to said first value or said second value.

6. A control apparatus as in claim 5 wherein said system operating condition corresponds to a loss of said speed feedback signal or an initial connection of an electric load to said power generation system.

7. A control apparatus as in claim 6 wherein said second predetermined function is the sum of a proportional, integral and derivative function of the difference between the value of said megawatt feedback signal and said second control signal value.

8. A control apparatus for operating an extraction steam turbine-electric power generation system in accordance with an electric load demand signal and for correcting the speed of said turbine by adjusting the steam inlet control valves so as to maintain synchronous speed during a disturbance in the existing electric load, said apparatus comprising:

means for generating a first feedback signal varying in accordance with said turbine speed;

means for generating a second feedback signal varying in accordance with said electric load;

means for producing a correction signal equal to the difference between the level of a fixed reference signal and the level of said first feedback signal when said difference exceeds a predetermined level;

means for modifying said electric load demand signal in accordance with said correction signal;

means for adjusting said steam inlet control valves in accordance with a predetermined function of said second feedback signal and said modified electric load demand signal.

9. A control apparatus as in claim 8 wherein said predetermined level exists between said fixed reference signal level and either a preset upper limit or a preset lower limit, said preset limits respectively above and below said fixed reference signal level.

10. A control apparatus as in claim 9 wherein said predetermined function is a proportional plus integral plus derivative function of the difference between said second feedback signal and said modified electric load demand signal.

11. A method for operating an extraction steam turbine-electric power generation system in accordance with an electric load demand signal and for correcting the speed of said turbine by adjusting the steam inlet control valves so as to maintain synchronous speeed during a disturbance in the existing electric load, said method comprising the steps of:

generating a first feedback signal varying in accordance with said turbine speed;

generating a second feedback signal varying in accordance with said electric load;

producing a correction signal equal to the difference between the level of a fixed reference signal and the level of said first feedback signal when said difference exceeds a predetermined level;

modifying said electric load demand signal in accordance with said correction signal;

adjusting said steam inlet control valves in accordance with a predetermined function of said second feedback signal and said modified electric load demand signal.

12. The method of claim 11 wherein said predetermined level exists between said fixed reference signal level and either a preset upper limit or a preset lower limit, said preset limits respectively above and below said fixed reference signal level.

13. The method of claim 12 wherein said predetermined function is a proportional plus integral plus derivative function of the difference between said second feedback signal and said modified electric load demand signal.

* * * * *